(12) United States Patent
Murray et al.

(10) Patent No.: US 8,123,935 B2
(45) Date of Patent: Feb. 28, 2012

(54) FILTER FOR REMOVING SEDIMENT FROM WATER

(75) Inventors: Christopher Adam Murray, Oakville (CA); Darren Francis Kevin Lawless, Oakville (CA); Gregory Richard Williams, London (CA); Stephen Eric Braun, Oakville (CA); Joel Anthony Garbon, Portland, OR (US)

(73) Assignee: Monteco Ltd., Toronto, Ontario (CA)

( * ) Notice: Subject to any disclaimer, the term of this patent is extended or adjusted under 35 U.S.C. 154(b) by 968 days.

(21) Appl. No.: 12/014,888

(22) Filed: Jan. 16, 2008

(65) Prior Publication Data
US 2009/0045128 A1 Feb. 19, 2009

Related U.S. Application Data

(63) Continuation-in-part of application No. 11/839,303, filed on Aug. 15, 2007.

(51) Int. Cl.
*B01D 29/66* (2006.01)
*B01D 29/52* (2006.01)
*C02F 1/00* (2006.01)

(52) U.S. Cl. ............. 210/108; 210/170.03; 210/323.1; 210/333.01; 210/304; 210/306; 210/512.1

(58) Field of Classification Search .............. None
See application file for complete search history.

(56) References Cited

U.S. PATENT DOCUMENTS 739,249 A * 9/1903 Woods .................. 210/451
(Continued)

FOREIGN PATENT DOCUMENTS

GB 2112295 7/1983
(Continued)

OTHER PUBLICATIONS

European Search Report dated May 2, 2011 for European Application No. 08827298.4.

(Continued)

*Primary Examiner* — Robert James Popovics
(74) *Attorney, Agent, or Firm* — Hunton & Williams LLP

(57) ABSTRACT

A system for removing sediment from water is disclosed. The exemplary embodiments described herein disclose a system comprising a filter chamber, having a deck positioned inside to divide it into an upper chamber and a lower chamber. The deck may have a plurality of holes to hold filtration elements and also may have a ridge or a skirt or both. An inlet line may be tangentially connected to the filter chamber and introduce influent liquid into the filter chamber below the deck and outside of the skirt.

8 Claims, 22 Drawing Sheets

U.S. PATENT DOCUMENTS

| | | | | |
|---|---|---|---|---|
| 1,371,110 | A | 3/1921 | Pelphrey | |
| 3,374,894 | A * | 3/1968 | Webster | 210/257.1 |
| 4,163,724 | A | 8/1979 | Muller et al. | |
| 4,192,751 | A | 3/1980 | Henton et al. | |
| 4,221,667 | A * | 9/1980 | Suhrheinrich | 210/304 |
| 4,246,114 | A * | 1/1981 | Krebs et al. | 210/151 |
| 4,279,743 | A * | 7/1981 | Miller | 209/731 |
| 4,678,567 | A * | 7/1987 | Ueda | 210/150 |
| 4,680,111 | A * | 7/1987 | Ueda | 210/150 |
| 4,860,591 | A * | 8/1989 | Garland | 73/861.04 |
| 4,983,294 | A * | 1/1991 | Lamb | 210/521 |
| 5,405,539 | A * | 4/1995 | Schneider | 210/747.3 |
| 5,498,331 | A * | 3/1996 | Monteith | 210/170.03 |
| 5,531,888 | A * | 7/1996 | Geiger et al. | 210/162 |
| 5,674,386 | A * | 10/1997 | Filion | 210/154 |
| 5,707,527 | A * | 1/1998 | Knutson et al. | 210/660 |
| 5,725,760 | A * | 3/1998 | Monteith | 210/170.03 |
| 5,770,057 | A * | 6/1998 | Filion | 210/162 |
| 5,779,888 | A * | 7/1998 | Bennett | 210/162 |
| 5,788,848 | A * | 8/1998 | Blanche et al. | 210/162 |
| 5,814,216 | A * | 9/1998 | Filion | 210/154 |
| 5,849,181 | A * | 12/1998 | Monteith | 210/163 |
| 5,980,740 | A * | 11/1999 | Harms et al. | 210/162 |
| 5,992,641 | A | 11/1999 | Caldwell, Jr. | |
| 6,062,767 | A * | 5/2000 | Kizhnerman et al. | 405/39 |
| 6,068,765 | A | 5/2000 | Montheith | |
| 6,086,756 | A * | 7/2000 | Roy | 210/155 |
| 6,241,881 | B1 * | 6/2001 | Pezzaniti | 210/155 |
| 6,406,218 | B1 * | 6/2002 | Olson | 405/36 |
| 6,419,843 | B1 * | 7/2002 | Natarius | 210/787 |
| 6,428,588 | B1 | 8/2002 | Holyoak et al. | |
| 6,428,692 | B2 * | 8/2002 | Happel | 210/155 |
| 6,475,381 | B1 * | 11/2002 | Gustafsson | 210/151 |
| 6,511,595 | B2 * | 1/2003 | Crompton et al. | 210/162 |
| 6,533,941 | B2 * | 3/2003 | Butler | 210/681 |
| 6,641,720 | B1 * | 11/2003 | Crompton et al. | 210/155 |
| 6,730,222 | B1 * | 5/2004 | Andoh et al. | 210/304 |
| 6,780,310 | B1 * | 8/2004 | Howe | 210/155 |
| 6,783,683 | B2 * | 8/2004 | Collings | 210/669 |
| 6,793,811 | B1 * | 9/2004 | Fleischmann | 210/163 |
| 6,797,162 | B2 * | 9/2004 | Happel | 210/163 |
| 6,849,214 | B2 | 2/2005 | Patil | |
| 6,866,447 | B1 | 3/2005 | Parker | |
| 6,869,528 | B2 * | 3/2005 | Pank | 210/170.03 |
| 6,913,155 | B2 * | 7/2005 | Bryant | 210/521 |
| 6,919,033 | B2 * | 7/2005 | Stark et al. | 210/787 |
| 6,951,619 | B2 * | 10/2005 | Bryant | 210/788 |
| 6,991,114 | B2 * | 1/2006 | Allen et al. | 210/519 |
| 6,998,038 | B2 * | 2/2006 | Howard | 210/111 |
| 7,083,721 | B2 * | 8/2006 | McClure et al. | 210/155 |
| 7,238,281 | B2 * | 7/2007 | Su et al. | 210/170.03 |
| 7,294,256 | B2 * | 11/2007 | Happel et al. | 210/155 |
| 7,296,692 | B2 * | 11/2007 | Allen et al. | 210/519 |
| 7,297,266 | B2 * | 11/2007 | Cobb et al. | 210/305 |
| 7,465,391 | B2 * | 12/2008 | Heist et al. | 210/162 |
| 7,485,218 | B2 * | 2/2009 | Dussich, I | 210/164 |
| 7,507,333 | B2 * | 3/2009 | Meyermann | 210/170.03 |
| 7,517,450 | B2 * | 4/2009 | Hersey et al. | 210/155 |
| 7,527,731 | B2 * | 5/2009 | Su et al. | 210/170.03 |
| 7,534,344 | B2 * | 5/2009 | Williamson et al. | 210/170.03 |
| 7,632,403 | B2 * | 12/2009 | Dierkes | 210/170.03 |
| 7,666,303 | B2 * | 2/2010 | Williams et al. | 210/170.03 |
| 7,758,747 | B2 * | 7/2010 | Bryant | 210/162 |
| 7,799,235 | B2 * | 9/2010 | Olson et al. | 210/767 |
| 8,011,239 | B1 * | 9/2011 | Chadwick et al. | 73/170.32 |
| 8,012,346 | B2 * | 9/2011 | Peters et al. | 210/170.03 |
| 8,034,237 | B2 * | 10/2011 | Happel et al. | 210/170.03 |
| 2001/0045392 | A1 * | 11/2001 | Gray et al. | 210/616 |
| 2002/0030005 | A1 * | 3/2002 | Crompton et al. | 210/304 |
| 2002/0117435 | A1 * | 8/2002 | Pank | 210/170 |
| 2003/0034286 | A1 * | 2/2003 | Butler | 210/163 |
| 2004/0055950 | A1 * | 3/2004 | Bryant | 210/521 |
| 2005/0040113 | A1 * | 2/2005 | Howard | 210/744 |
| 2005/0040118 | A1 * | 2/2005 | Bryant | 210/787 |
| 2005/0056587 | A1 * | 3/2005 | Allen et al. | 210/519 |
| 2005/0077248 | A1 * | 4/2005 | Stark et al. | 210/747 |
| 2005/0145555 | A1 * | 7/2005 | Cobb et al. | 210/305 |
| 2005/0145562 | A1 * | 7/2005 | Allen et al. | 210/519 |
| 2005/0167372 | A1 * | 8/2005 | Heist et al. | 210/787 |
| 2005/0184007 | A1 * | 8/2005 | Allard et al. | 210/512.2 |
| 2005/0263448 | A1 * | 12/2005 | Heist et al. | 210/304 |
| 2006/0016767 | A1 * | 1/2006 | Olson et al. | 210/767 |
| 2006/0163147 | A1 * | 7/2006 | Dierkes et al. | 210/446 |
| 2006/0207922 | A1 * | 9/2006 | Dussich | 210/164 |
| 2007/0012608 | A1 * | 1/2007 | Su et al. | 210/170.03 |
| 2007/0056889 | A1 * | 3/2007 | Heist et al. | 210/162 |
| 2007/0289908 | A1 * | 12/2007 | Williamson et al. | 210/170.03 |
| 2008/0047886 | A1 * | 2/2008 | Lambert et al. | 210/163 |
| 2008/0073258 | A1 * | 3/2008 | Su et al. | 210/170.03 |
| 2008/0121579 | A1 * | 5/2008 | Dierkes | 210/170.03 |
| 2008/0121594 | A1 * | 5/2008 | Dierkes | 210/788 |
| 2009/0020466 | A1 * | 1/2009 | Williams et al. | 210/170.03 |
| 2009/0045128 | A1 * | 2/2009 | Murray et al. | 210/340 |
| 2009/0045149 | A1 * | 2/2009 | Murray et al. | 210/785 |
| 2009/0166278 | A1 * | 7/2009 | Bryant | 210/170.03 |
| 2009/0166279 | A1 * | 7/2009 | Happel et al. | 210/170.03 |
| 2010/0025313 | A1 * | 2/2010 | Dierkes | 210/170.03 |
| 2010/0187188 | A1 * | 7/2010 | Ghalib | 210/764 |
| 2011/0062088 | A1 * | 3/2011 | Olson et al. | 210/747 |
| 2011/0100887 | A1 * | 5/2011 | Ballistreri | 210/170.03 |

FOREIGN PATENT DOCUMENTS

| | | |
|---|---|---|
| WO | 9741068 | 11/1997 |

OTHER PUBLICATIONS

Aqua Cloth Media Filtration; Aqua-Aerobic Systems, Inc.; Bulletin #600H Oct. 2006; Copyright 2006.

International Preliminary Report on Patentability Mailed Feb. 25, 2010 for International Application No. PCT/US2008/073311.

* cited by examiner

DIRECTION OF FLOW

DIRECTION OF FLOW

FILTER FOR REMOVING SEDIMENT FROM WATER

This is a continuation-in-part of U.S. patent application Ser. No. 11/839,303, which was filed on Aug. 15, 2007 and entitled "FILTER FOR REMOVING SEDIMENT FROM WATER," the disclosure of which is incorporated by reference.

BACKGROUND OF THE INVENTION

1. Field of the Invention

The present invention generally relates to an apparatus, system, and method for removing sediment from water, and, more particularly, to an elongated filtratable element used for removing sediment from stormwater.

2. Description of the Related Art

Stormwater runoff is rainfall or snowmelt that travels over the ground or impervious surfaces—roofs of buildings, homes and sheds, roadways, parking lots, sidewalks and driveways—and drains into natural or manmade drainage ways. In some cases, stormwater runoff drains directly into bodies of water. Stormwater runoff does not usually receive any treatment before it enters streams, lakes, and other surface waters, and it is a major source of water pollution. For example, various harmful pollutants, such as pesticides, fertilizer, litter, car oil, bacteria, trace metals, and sediment, are washed off with stormwater runoff into storm drains, or directly into streams, rivers, and lakes.

One of the harmful pollutants of major concern is sediment. Sediment is soil particles from stream banks, construction sites, and other areas, that are dislodged by stormwater runoff and deposited into streams, lakes, and rivers. Sediment accumulates in water bodies and destroys feeding grounds for aquatic life, clogs fish gills, blocks light, increases water temperature, and can cause other adverse environmental impacts.

Currently, sedimentation-based tanks are used to remove the majority of sediment that is dislodged by stormwater runoff. Sedimentation-based tanks, however, cannot completely remove all of the fine sediment from stormwater because of the required settling time needed for fine sediment to be removed from stormwater. For example, settling out the fine sediment in stormwater would require a large and uneconomical sedimentation-based tank. Therefore, in addition to sedimentation-based tanks, granular media filter systems are used downstream of sedimentation-based tanks to remove fine sediment. Granular media filter systems utilize different types of granular media to trap fine sediment in the interstitial gaps formed between the granular media. However, as the fine sediment continues to accumulate, the interstitial gaps eventually clog and must be frequently recharged. Granular media filter systems can be partially recharged through pressurized backwashing, but pressurized backwashing piping and controls are complicated and expensive.

In addition to granular media filter systems, a variety of other filter systems are available for filtering contaminated fluids. For example, filter cloths consisting of pile threads may be used, U.S. Pat. No. 6,103,132, which is incorporated by reference herein. While these types of filters and others like them have their merits, they also have their drawbacks. For example, the filters have a small amount of surface area available for trapping fine sediment. As a result, during high flow events, the filter systems quickly clog, causing the stormwater runoff to back up. In addition to filter cloths, flexible hose-type filter elements have been used, U.S. Pat. No. 4,163,724, which is incorporated by reference herein. Such hose-type filter elements, however, rely on pressurized flow to effect separation.

SUMMARY OF THE INVENTION

A system for removing sediment from water is disclosed. According to one embodiment of the present invention, the system comprises a filter chamber defining an internal chamber; a deck positioned within the internal chamber and dividing the filter chamber into an upper chamber and a lower chamber, the deck having a plurality of holes formed therein, each hole adapted to receive a filtration element therein; and an inlet line for communicating an influent liquid to the filter chamber at a location that is below the deck; wherein the inlet line is positioned such that the influent liquid is introduced tangentially into the filter chamber.

According to another embodiment of the present invention, the system comprises a filter chamber defining an internal chamber; a deck positioned within the internal chamber and dividing the filter chamber into an upper chamber and a lower chamber, the deck having a plurality of holes formed therein, each hole adapted to receive a filtration element therein; an inlet line for communicating an influent liquid to the filter chamber; and a ridge positioned on a top surface of the deck, wherein the ridge forms a perimeter on the top surface of the deck.

According to another embodiment of the present invention, the system comprises a filter chamber defining an internal chamber; a deck positioned within the internal chamber and dividing the filter chamber into an upper chamber and a lower chamber, the deck having a plurality of holes formed therein, each hole adapted to receive a filtration element therein; an inlet line for communicating an influent liquid to the filter chamber; and a skirt positioned on a bottom surface of the deck.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1A:
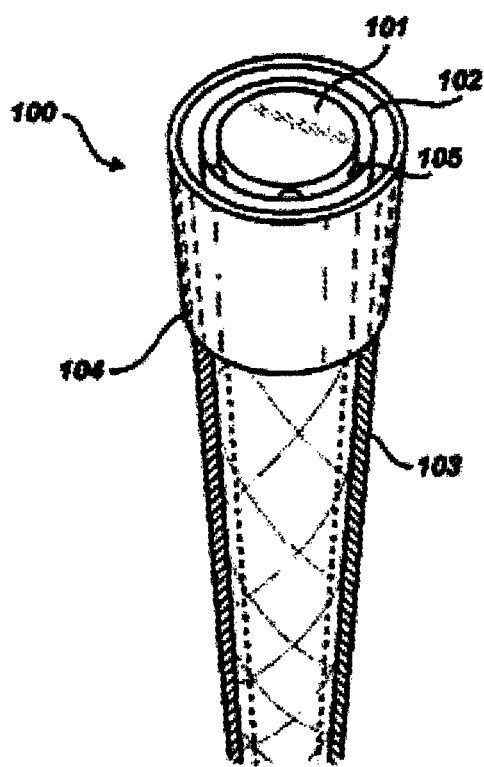
FIG. 1A is a perspective view of a elongated filtratable element according to one embodiment of the present invention.

Although the present invention is described in the context of stormwater filtration, the invention is not so limited. Rather, the present invention has application as a filter media for many types of liquid, including water. Stormwater runoff generally has an "organic portion" and an "aqueous portion." The organic portion of stormwater runoff typically has a relatively high amount of sediment, which includes, for example, dislodged soil particles from stream banks, construction sites, and other areas, as well as other suspended particles that may or may not be organic. The aqueous portion of stormwater is primarily water. As used herein, the term "downstream" in a process system means later in the direction of general process or fluid flow, and the term "upstream" means earlier in the direction of general process or fluid flow.

Disclosed embodiments of the present invention and their advantages may be understood by referring to FIGS. 1-14, wherein like reference numerals refer to like elements.

In accordance with an embodiment of the present invention described herein is an elongated filtratable element that has a large amount of surface area for filtering a substantial amount of fine sediment from stormwater. The disclosed filtratable element can be used individually or in combination with other filtratable elements. And, the filtratable elements can be combined with current stormwater filtering systems to improve efficiency.

According to one embodiment of the present invention, the elongated filtratable element may be a tubular element or hollow tube with a permeable fiberglass filter media that surrounds a flexible inner core. The fiberglass filter media may have a porosity such that it allows the aqueous portion of stormwater to pass through, while trapping sediment.

Referring to FIGS. 1A-1E, perspective views of elongated filtratable element 100 and its components are shown. Referring to FIG. 1A, according to one embodiment, each elongated filtratable element 100, or tentacle, includes three general components: support member 101, filter mat 102, and outer casing 103. In general, support member 101 prevents the surrounding filter mat 102 from collapsing. Filter mat 102 consists of any permeable filtratable material that surrounds inner core 101. Filter mat 102 may be adapted to filter a substantial amount of fine sediment from stormwater runoff. Outer casing 103 protects filter mat 102 from abrasion. Each component will be described in greater detail below.

In one embodiment, support member 101 may be adapted to be an inner core that serves as a frame for elongated filtratable element 100, and may be provided to prevent elongated filtratable element 100 from collapsing upon itself. Support member 101 may comprise a flexible support tube made of any water permeable member, such as a polymer membrane. While any water permeable polymer materials may be used, in one embodiment, support member 101 may be made of a plastic, such as polyurethane, acrylate, polypropylene or polyethylene.

In another embodiment, support member 101 may be made of any water impermeable member. Support member 101 may be adapted so that it has a negligible effect on sediment removal and has negligible head loss associated with it under typical flows.

In another embodiment, support member 101 may comprise a more rigid, even an inflexible, support structure made of metal or plastic that is adapted to allow for the passage of stormwater. Support member 101 may be manufactured by way of plastic injection molding, as is well known in the art.

In still another embodiment, support member 101 may be an inner frame comprised of support rings or rods, or a combination of both. In still another embodiment, support member 101 may be formed as an integral component of filter mat 102. Support member 101 may be of any suitable shape, and for example, may be round, square, or rectangular in shape. Support member 101 may be made of a corrosion-resistant material, as is well known in the art. Other sizes, shapes, or materials may be used for support member 101 as necessary and/or desired.

Figure 1B:
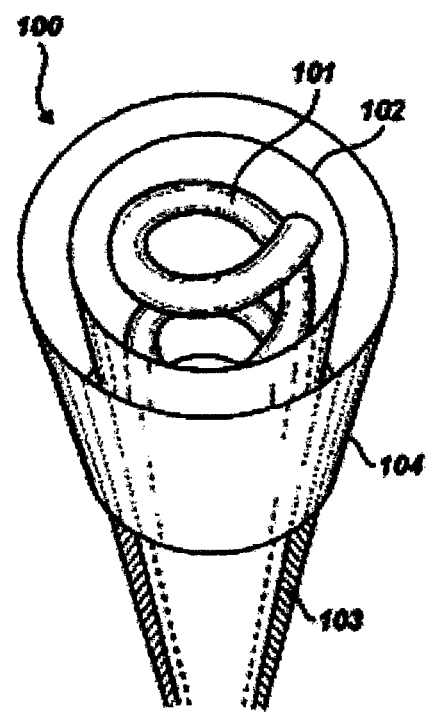
FIG. 1B is a perspective view of a elongated filtratable element according to one embodiment of the present invention.

Referring to FIG. 1B, support member 101 is shown according to another embodiment of the present invention. In this embodiment, support member 101 may be a flexible coil that serves as the foundation for the elongated filtratable element 100.

Filter mat 102 serves to filter and trap sediment and other particles in stormwater. In one embodiment, filter mat 102 may comprise a tube of non-woven filtration media that surrounds support member 101, if provided. In one embodiment, shown in FIG. 2, filter mat 102 may be comprised of two parts: backing mesh 202 and fiberglass batting 201. Backing mesh 202 may include a comparatively course, non-woven plastic support layer, and fiberglass batting 201 may include a plurality of individual fiberglass fibers.

The use of fiberglass batting 201 provides several advantages. For example, fiberglass batting 201 may be high in surface area, self-cleanable, easily maintained, durable, and economical.

In order to create filter mat 102, a plurality of fiberglass fibers, of the same or different diameters and/or lengths, may be attached to backing mesh 202. In another embodiment, filter mat 102 may be comprised of any natural filaments or synthetic filaments. For example, filter mat 102 may also comprise graphite filaments, metallic filaments, glass filaments, polymer fibers, or any other suitable material as necessary and/or desired.

In one embodiment, filter mat 102 may have a relatively high porosity (i.e., it allows relatively large particles to pass). For example, backing mesh 202 may be comprised of 10-20 μm plastic fibers that form openings of more than about 200 μm, and fiberglass batting 201 may be comprised of less than 1 μm fiberglass fibers that are loosely packed.

In another embodiment, filter mat 102 may have a relatively low porosity (i.e., it allows only relatively small particles to pass). In this embodiment, backing mesh 202 may be comprised of 10-20 μm plastic fibers that form openings of less than about 200 μm, and fiberglass batting 201 may be comprised of less than 1 μm fiberglass fibers that are tightly packed.

One of ordinary skill in the art can readily determine appropriate fiber length, diameter, and percentage of porosity for filter mat 102 depending on the expected stormwater flow rate and sediment particle size.

Figure 3A:
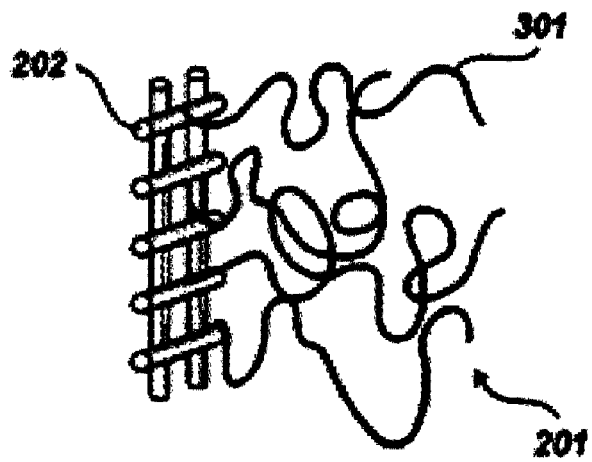
FIGS. 3A-3C are perspective views of magnified sections of a filter mat according to one embodiment of the present invention.
Figure 3B:
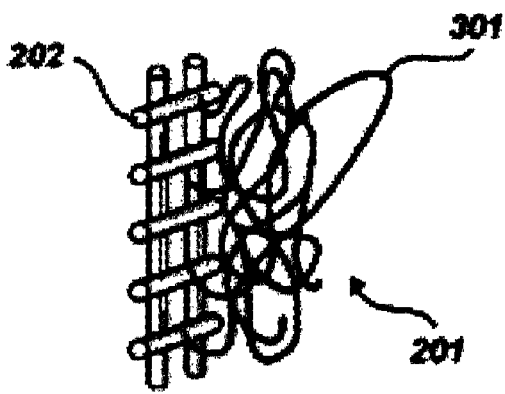
Figure 3C:
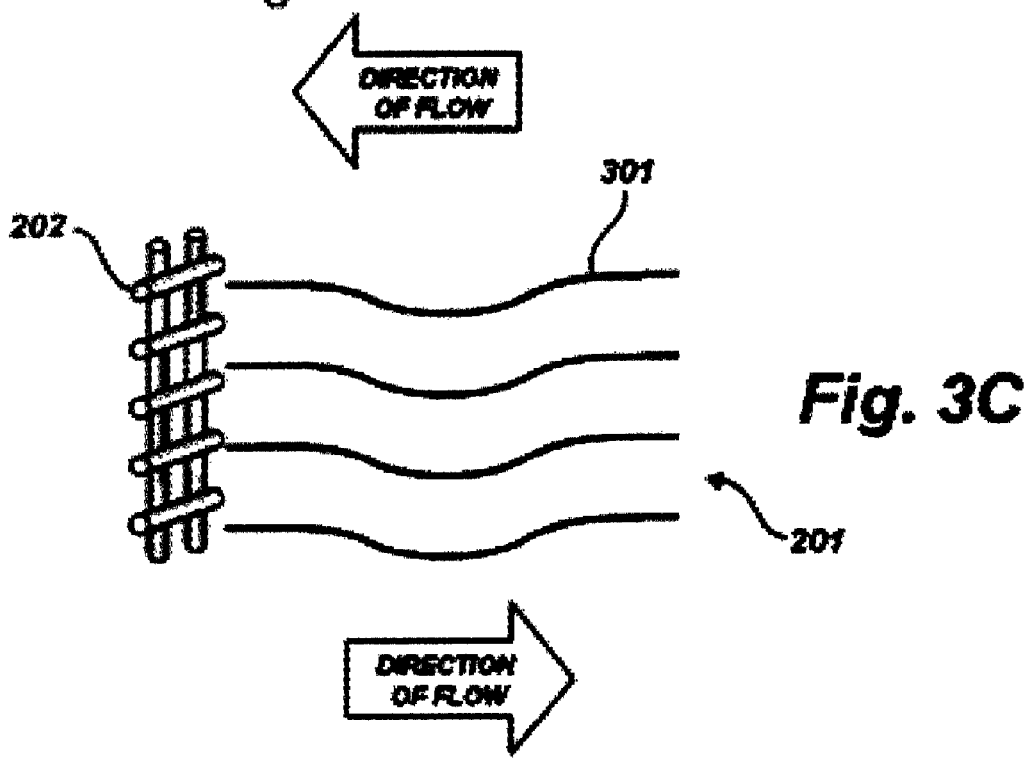

Referring to FIG. 3A, a magnified portion of filter mat 102 is shown, according to one embodiment of the present invention. In one embodiment, individual filter media filaments 301, made of any suitable material, are attached to backing mesh 202. In the aggregate, individual filaments 301 comprise fiberglass batting 201. When filter mat 102 is exposed to stormwater flow, as shown in FIG. 3B, fiberglass batting 201 may be pressed against backing mesh 202 to create a compact, yet permeable, filter bed. When filter mat 102 is backwashed, as shown in FIG. 3C and described in greater detail below, filtrate flows through each filtratable element 100 in the opposite direction, causing filaments 301 of fiberglass batting 201 to be forced away from backing mesh 202. Backwashing regenerates each element 100 by removing a substantial amount of trapped sediment.

Figure 1C:
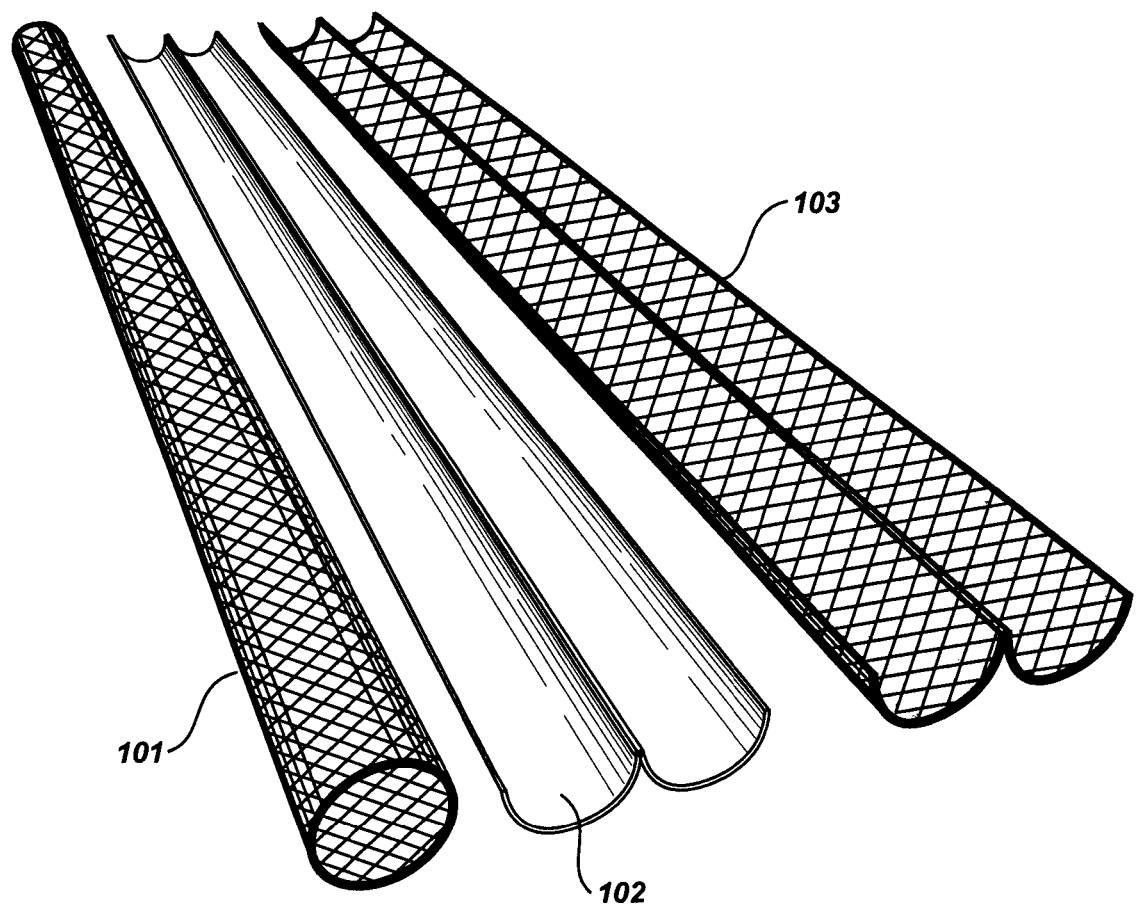
FIG. 1C is a perspective view of each component that comprises a filtratable element according to one embodiment of the present invention.
Figure 1D:
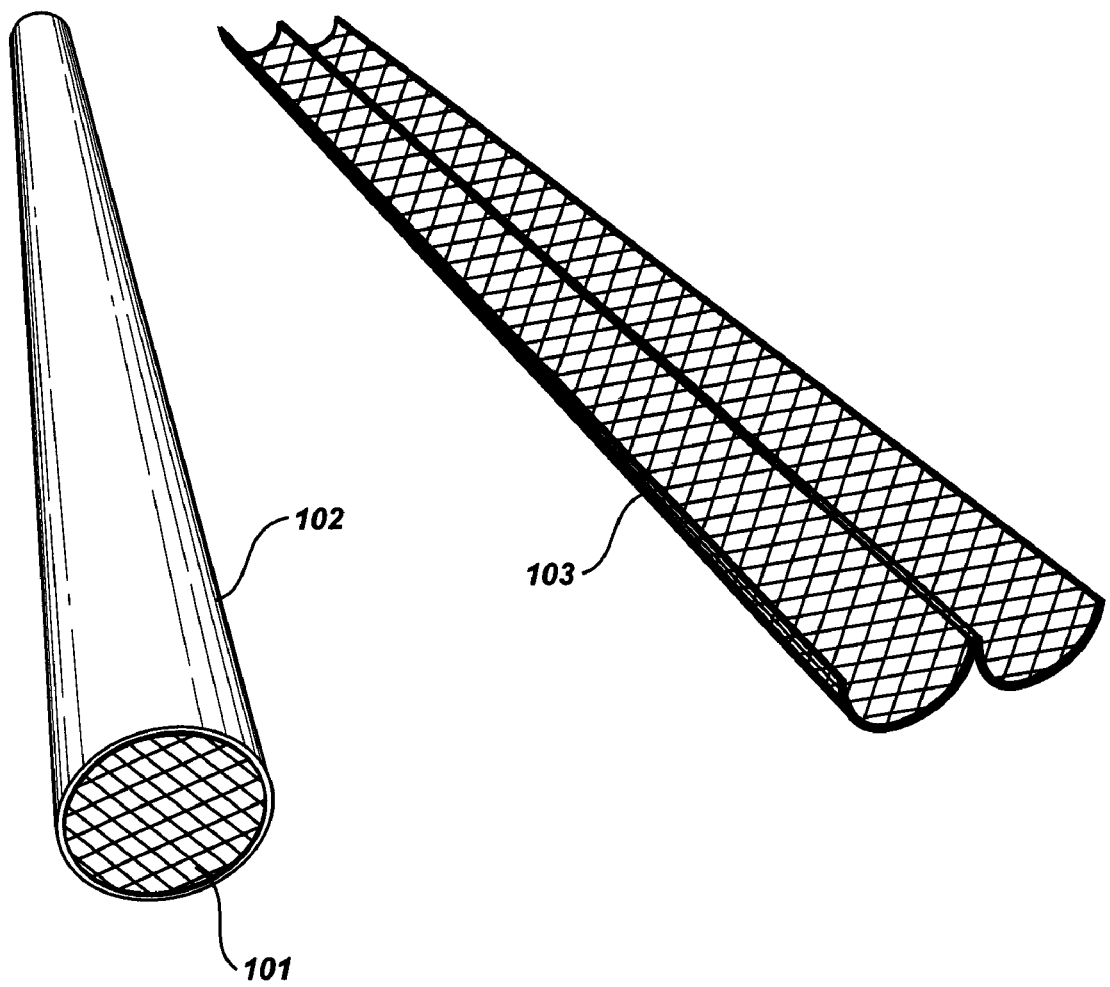
FIG. 1D is a perspective view of a partially assembled filtratable element according to one embodiment of the present invention.
Figure 1E:
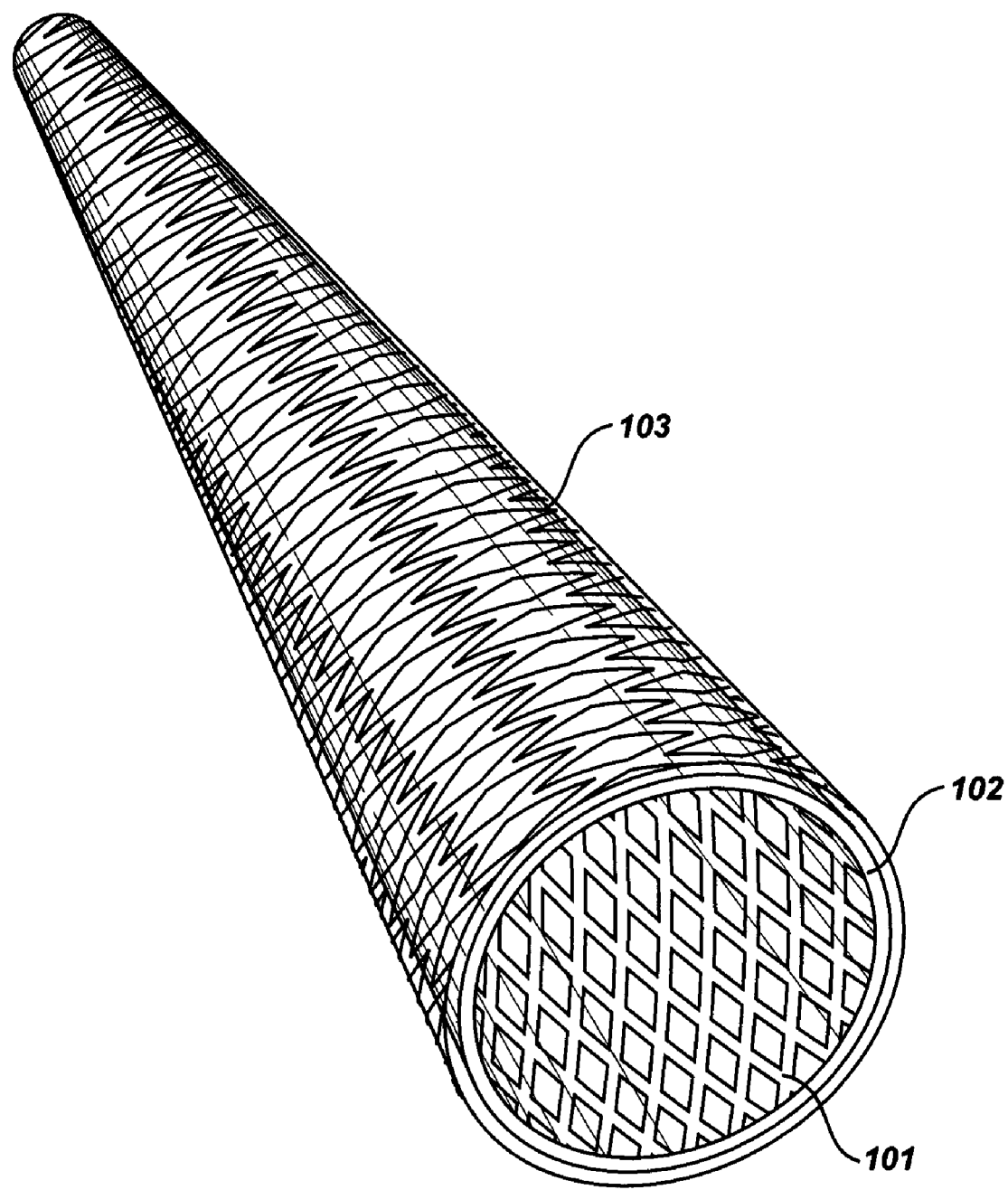
FIG. 1E is a perspective view of fully assembled filtratable element according to one embodiment of the present invention.
Figure 2:
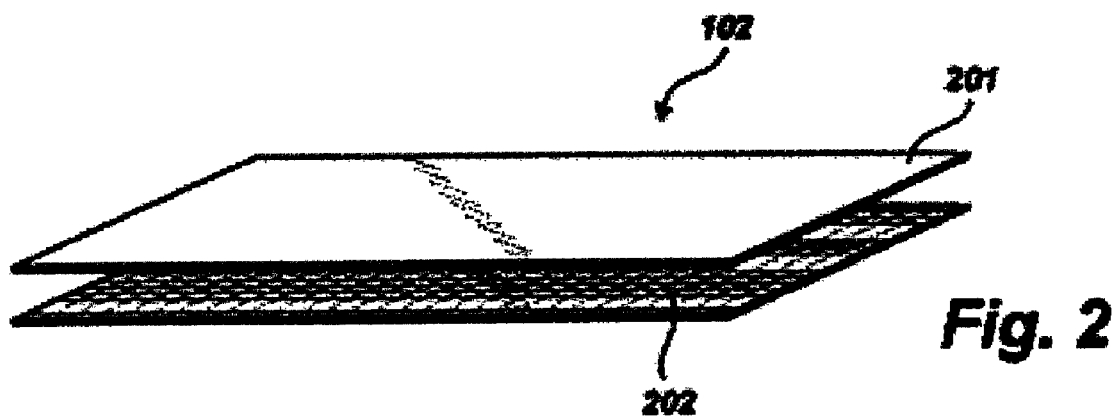
FIG. 2 is a perspective view of a preassembled filter mat according to one embodiment of the present invention.

Referring to FIGS. 1C-1E, filter mat 102 may be formed into a tube. Filter mat 102 may be adapted to surround support member 101 so that backing mesh 202 faces or contacts support member 101. Filter mat 102 may consist of two half-cylinders. The half-cylinders may be connected by a hinge. As an example, filter mat 102 may be snap-fitted over support member 101, as best shown in FIG. 1D. Filter mat 102 may also be adapted such that it is not a rigid element, and it may be folded over support member 101. Outer casing 103 may be adapted to surround filter mat 102. In one embodiment, outer casing 103 may consist of two half-cylinders. The half-cylinders may be connected by a hinge. As an example, outer casing 103 may be snap-fitted over filter mat 102, as best shown in FIG. 1E.

Referring back to FIGS. 1A and 1B, spacers 105 may be disposed between support member 101 and filter mat 102. Spacers 105 may be used to fasten or attach filter mat 102 to support member 101. Spacers 105 may also allow for the aqueous portion of the stormwater to freely permeate through filter mat 102. Spacers 105 may be made of the same material as support member 101, or any other suitable material. The size, shape, number, and location of spacers 105 may be varied as necessary and/or desired.

Outer casing 103, according to one embodiment of the present invention, protects filter mat 102 and fiberglass batting 201 from abrasion. Because stormwater runoff may contain a substantial amount of sediment, it has a tendency to abrade and destroy unprotected filter media as it permeates through. Outer casing 103 may also protect filter mat 102 from abrasion that may be caused by large debris or occur during normal handling of the filtratable element 100 or groups of elements, such as during typical packaging, transportation, and installation activities. In one embodiment, outer casing 103 may be a wire mesh screen. In another embodiment, outer casing 103 may be a nylon screen. The mesh size of outer casing 103 may be adapted such that the screen does not trap sediment, nor become clogged. One of ordinary skill in the art can readily determine the appropriate mesh size. Further, in addition to protecting filter mat 102 from abrasion, outer casing 103 adds to the stability and strength of the elongated filtratable element 100.

In one embodiment, elongated filtratable element 100 may be constructed without outer casing 103. Under some flow conditions and depending on the amount of sediment expected in the stormwater runoff, outer casing 103 may be unnecessary. Moreover, filter mat 102 may be constructed of a material that reduces the risk of abrasion and eliminate the need for outer casing 103. One of ordinary skill in the art can readily determine the need for outer casing 103.

In one embodiment, support member 101, filter mat 102, and outer casing 103 may be coated or treated with an antimicrobial agent. Antimicrobial agents are materials that are able to reduce or eliminate the microbial growth, e.g., bacteria, yeasts, molds. Microbes, if left untreated, may reduce the separation efficiency of filtratable elongated element 100, and eventually clog the filter media. In one embodiment, chitosan may be introduced into the stormwater or used to coat filtratable element 100 to prevent or reduce microbial degradation. Chitosan causes the fine sediment particles to bind together and may also remove phosphorus, heavy minerals, and oils from stormwater. Other antimicrobial agents may also be used as necessary and/or desired.

Elongated filtratable element 100 may be adapted to increase the available surface area for removing sediment. In one embodiment, this may involve pleating, crimping, or finning the surface of elongated filtratable element 100. Other constructions that increase the surface area may be used as necessary and/or desired.

In one embodiment, elongated filtratable element 100 may be provided with a packing or granular filtration media, for example, sand, polyethylene beads, clay, perlite, etc, in order to adsorb contaminants that might be present in stormwater.

Figure 4A:
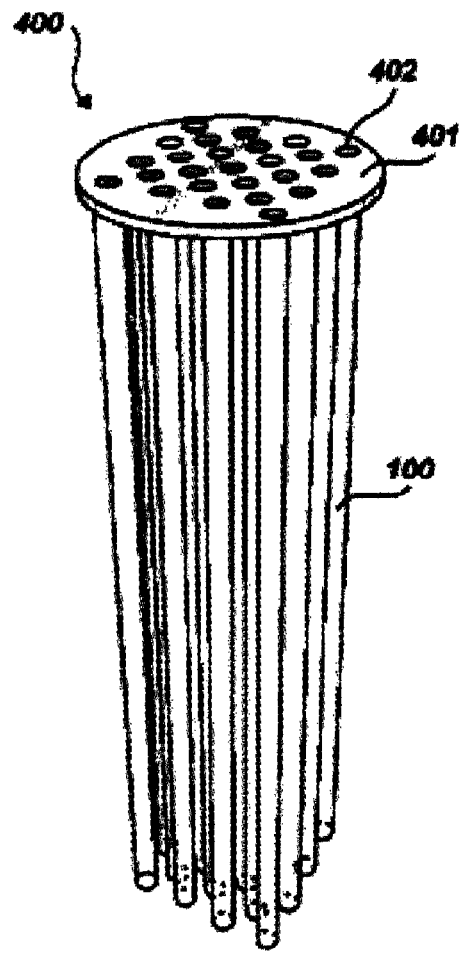
FIGS. 4A-4B are perspective views of a filtration cartridge according to one embodiment of the present invention.
Figure 4B:
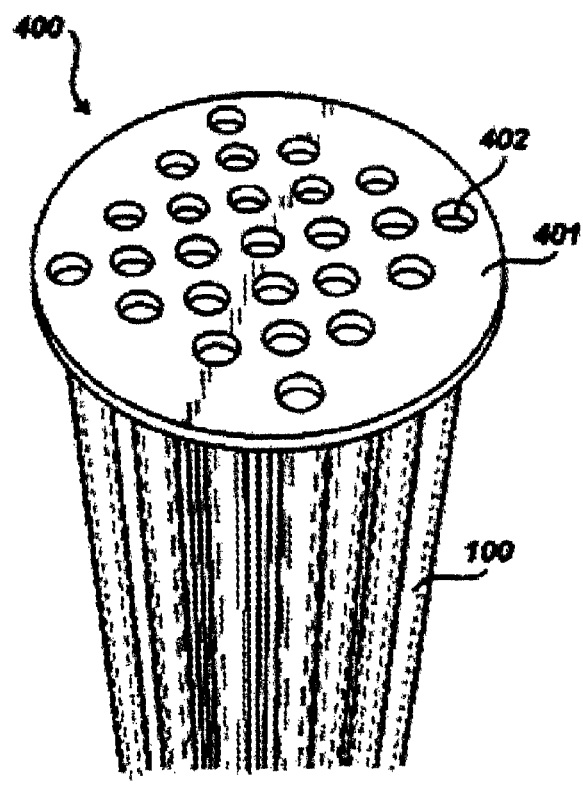

Referring to FIGS. 4A and 4B, filtration cartridge 400 is shown, according to embodiment of the present invention. Filtration cartridge 400 may include two general components: central manifold 401 and a plurality of elongated filtratable elements 100. Central manifold 401 may be a deck with a plurality of holes 402, adapted to receive a plurality of elongated filtratable elements 100. Central manifold 401 may also be considered a plate. Central manifold 401 may also be a tube having top and bottom plates that are separated by a gap. The tube may be of any suitable shape. For example, it may be cylindrical or cubical.

In one embodiment, central manifold 401 may be comprised of an impermeable plastic, and it may be of any suitable shape. For example, central manifold may be round, square, or rectangular in shape. In one embodiment, the shape of central manifold 401 may be selected to correspond to the opening in which it is to be placed.

In one embodiment, central manifold 401 may also be coated with an antimicrobial agent to prevent unwanted microbe growth, as discussed above.

Central manifold 401 may include a plurality of holes 402, with each hole 402 being sized and adapted to receive at least one elongated filtratable element 100.

Figures 5A, 5B:
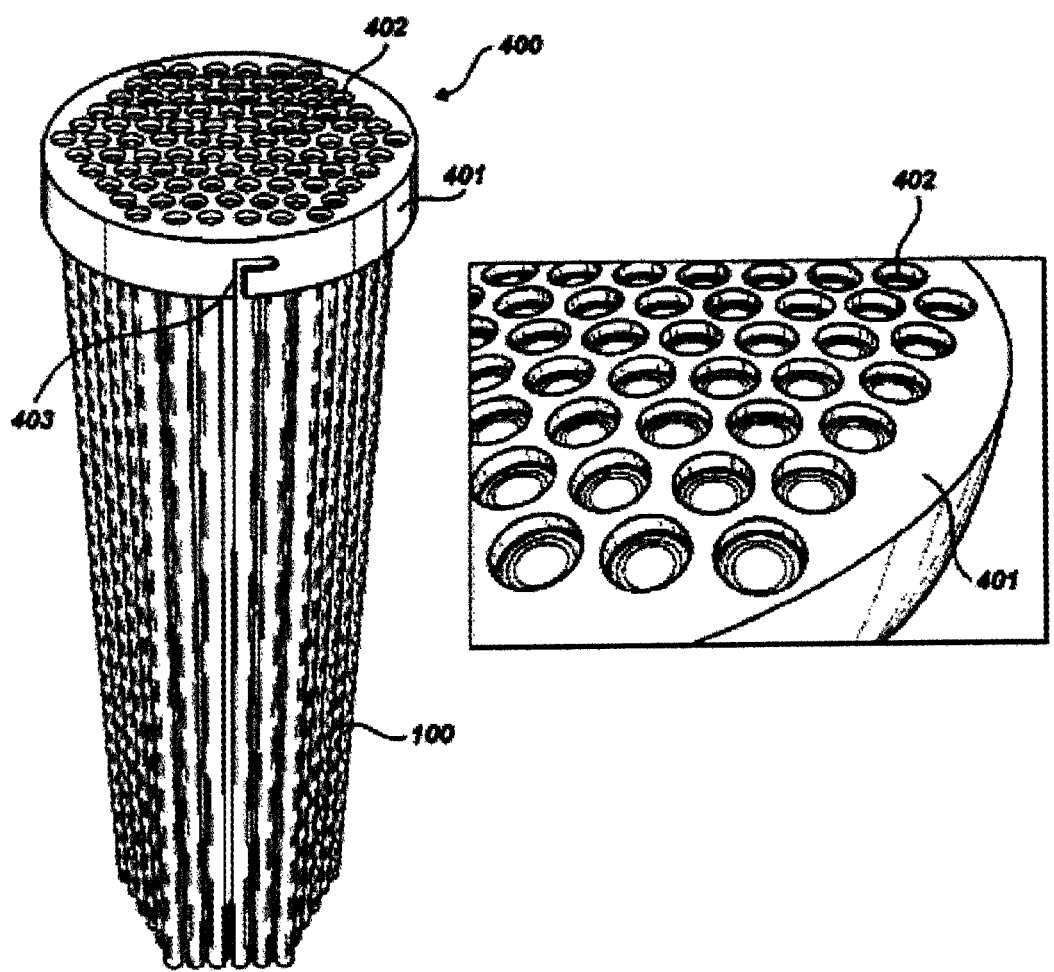
FIG. 5A-5B are perspective views of a filtration cartridge according to one embodiment of the present invention.

Referring to FIGS. 5A and 5B, according to one embodiment of the present invention, central manifold 401 of filtration cartridge 400 may have a sidewall with at least one notch 403. Notch 403 may be provided so that central manifold 401 may be easily fitted into stormwater filtration systems.

Figure 5C:
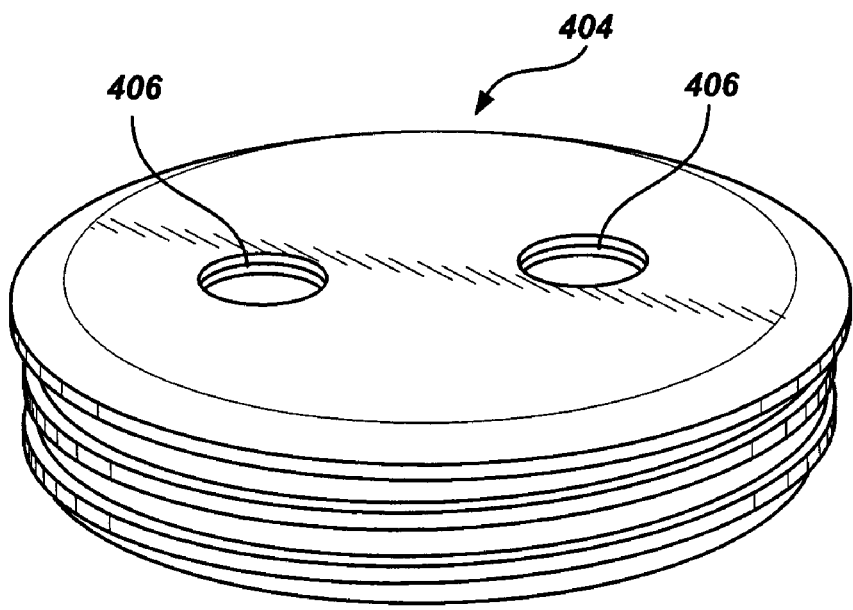
FIGS. 5C-5D are perspective views of a lid for the filtration cartridge according to one embodiment of the present invention.
Figure 5D:
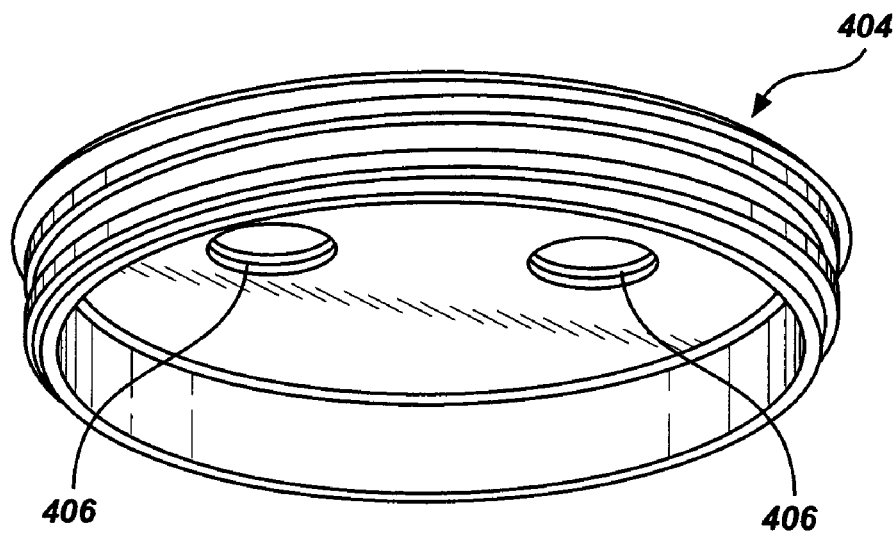
Figure 6A:
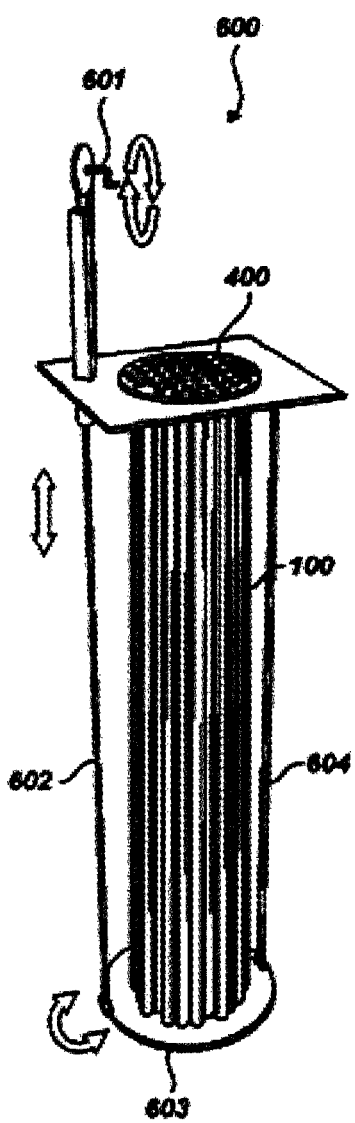
FIG. 6 is a perspective view of a shaking mechanism according to one embodiment of the present invention.
Figure 6B:
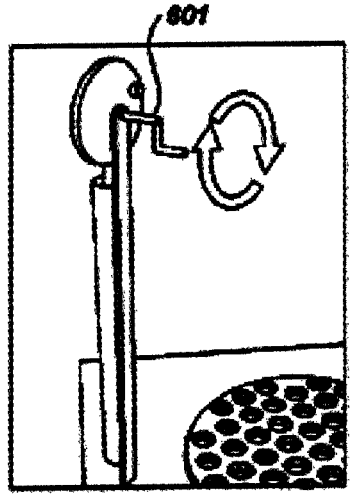
Figure 6C:
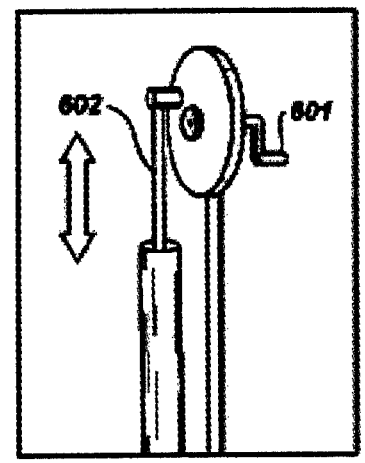
Figure 6D:
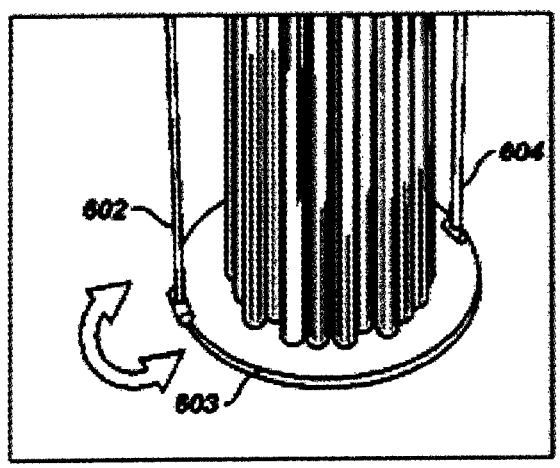

Referring to FIGS. 5C and 5D, filtration cartridge 400 may be fitted with a lid 404. Lid 404 may have at least one hole 406 for restricting flow through elongated filtratable elements 100 that are attached to central manifold 401. In one embodiment, lid 404 may have only one hole 406. In another embodiment, lid 404 may have two holes 406. Other numbers and arrangements of holes 406 may be used as necessary and/or desired.

Lid 404 may have threaded walls. Each filtration cartridge 400 may have a ring (not shown) that fits around cartridge 400 so that lid 404 may be attached to cartridge 400. Each filtration cartridge 400 with lid 404 attached thereto may be installed into a filtration system. Lid 404 may be of any suitable shape. Further, the amount of space between the top of filtration cartridge 400 and the bottom of lid 404 may be changed as necessary and/or desired.

With reference to FIGS. 1, 4A, 4B, 5A and 5B, each elongated filtratable element 100 may be fitted with a cap 104 for attaching each elongated filtratable element 100 to central manifold 401. For example, in one embodiment, holes 402 may be sized to hold 1" diameter elongated filtratable elements 100. In another embodiment, each hole 402 may be adapted to hold more than one elongated filtratable element 100. Further, the shape of holes 402 may vary to accommodate differently shaped elongated filtratable elements 100.

In one embodiment, holes 402 are open and uncovered so as to reduce the chance of additional clogging. Although, in another embodiment, holes 402 can be provided with a filter, for example, a layer of porous media, to provide an additional filtration. The porous media may also be able to adsorb or to react with dissolved components in the water.

In one embodiment, filtration cartridge 400 may include a substantial number of filtratable elements 100. For illustration only, more than 100 elongated filtration elements 100 may be provided. More or fewer filtration elements 100 may be provided. Each elongated filtration element 100 may be about 1" in diameter, although each filtration element 100 may have a different diameter, length, and/or shape.

Filtration cartridge 400 may be of any size and shape to accommodate different operating conditions. Filtration cartridge 400 may be assembled such that elongated filtration elements 100 dangle freely from cartridge 400. Because each elongated element 100 may be flexible and dangle freely from cartridge 400, filter cartridge 400 may be easily maintained by mechanical means, such as vibration and/or shaking. Moreover, if one elongated filtratable element 100 becomes clogged or damaged, filtration cartridge 401 allows for it to be individually replaced.

Referring to FIGS. 6A-6D, a shaking mechanism for filtration cartridge 400 is shown, according to an embodiment of the present invention. In one embodiment, shaking mechanism 600 may be an accessible, manually-operated mechanism that includes a hand crank 601, a shaft 602, a base 603, and a bar 604. Shaking mechanism 600 may be designed such that it causes at least one filtration cartridge 400 to rotate, thereby removing any trapped sediment from each elongated element 100. Hand crank 601 may be adapted so that it extends above filtration cartridge 400 and may be easily turned. Turning hand crank 601 causes shaft 602 to rotate base 603. Bar 604 connects base 603 to a deck in which filtration cartridge 400 may be installed. The rotating motion of filtration cartridge 400 causes the freely dangling elongated filtratable elements 100 to shake, which may remove trapped sediment. In another embodiment, shaking mechanism 600 may be automated. Other shaking and/or vibration mechanisms may be used as necessary and/or desired.

Figure 7:
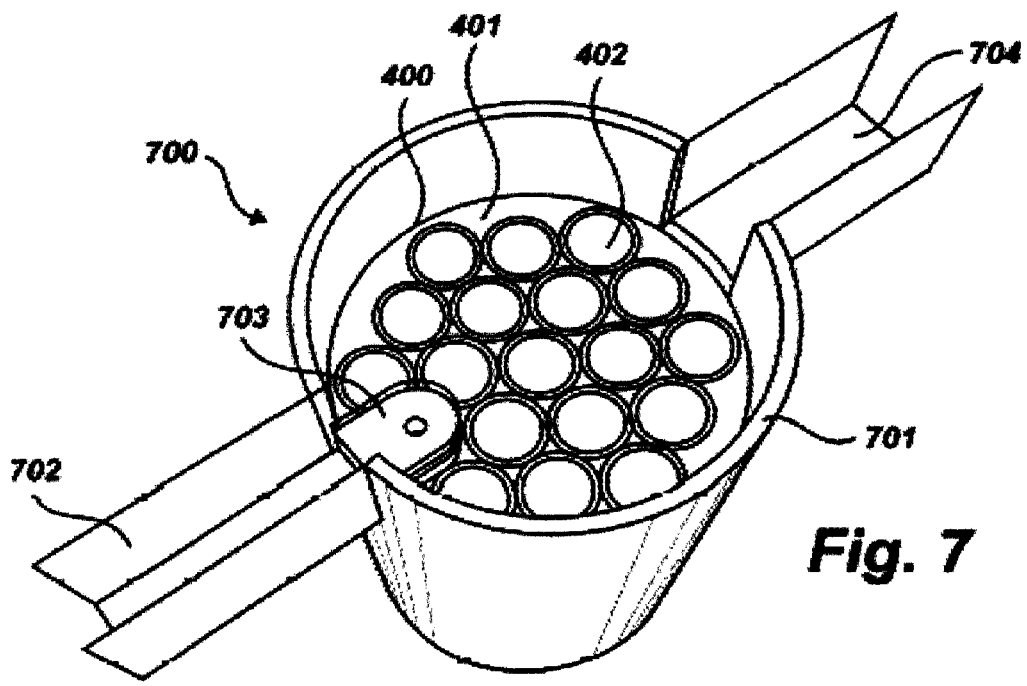
FIG. 7 is a perspective view of a filtering system according to one embodiment of the present invention.

Referring to FIG. 7, a filtration system 700 is shown, according to one embodiment of the present invention. Filtration system 700 may include five general components: a filtration chamber 701, an inlet line 702, an inlet device 703, one or more filtration cartridges 400, and an outlet line 704. In general, one or more filtration cartridges 400 may be placed inside filtration chamber 701. If more than one filtration cartridge 400 is placed inside filtration chamber 701, a deck may be used. Inlet line 702 introduces stormwater into filtration chamber 701 through inlet device 703, and outlet line 704 discharges the filtrate.

In one embodiment, filtration chamber 701 may house a single filtration cartridge 400. Filtration chamber 701 may either be open to the atmosphere, or it may be enclosed. Further, filtration chamber 701 may either be located aboveground or underground. Filtration chamber 701 may be of any conventional type or shape and may be constructed from steel, fiberglass, concrete, or plastic, or other suitable materials.

Filtration cartridge 400 may be flush with the walls of filtration chamber 701 so as to prevent stormwater from seeping upwards between filtration cartridge 400 and filtration chamber 701. Filtration cartridge 400 may be fitted with a conformable seal to contact the sidewalls of filtration chamber 701 to prevent seepage.

In another embodiment, filtration chamber 701 may house a plurality of filtration cartridges 400, using a deck. One of ordinary skill in the art can readily determine the number of filtration cartridges, and, correspondingly, the number of elongated filtratable elements 100 needed for a given operation. One advantage to filtration chamber 701 having a plurality of filtration cartridges 400 is that more filtration cartridges 400 provides for more filtratable surface area, increasing the operating life of and flow rate through filtration system 700. In another embodiment, filtration cartridge 400 may be configured or fitted in a different arrangement. For example, filtration cartridge 400 may be adapted to be horizontal or inverted. Further filtration cartridge 400 may be located inside inlet line 702. Other configurations and locations for filtration cartridge 400 may be used as necessary and/or desired.

Figure 8:
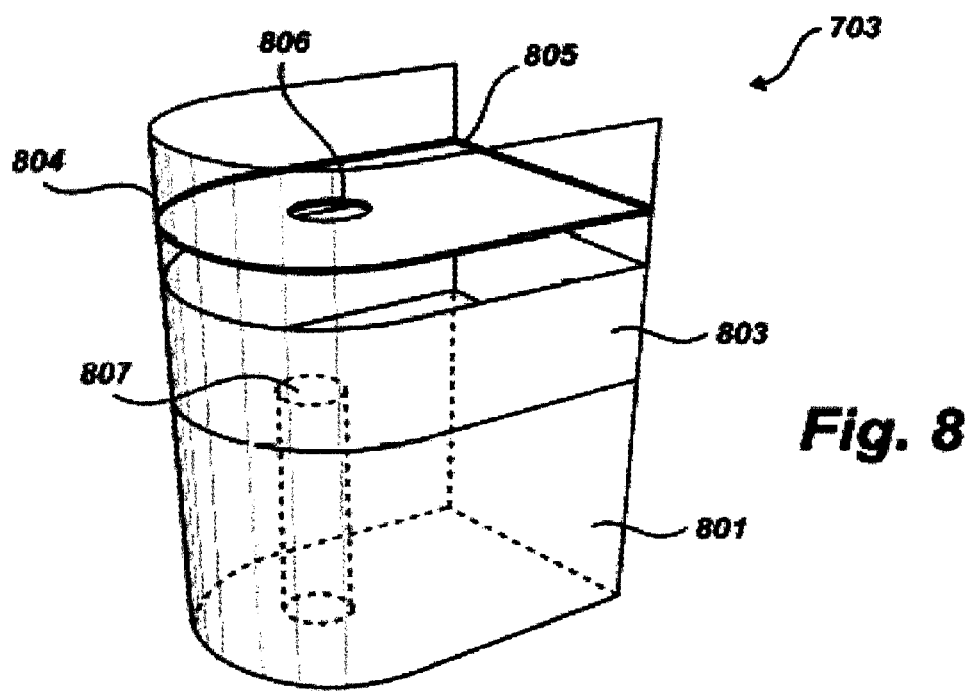
FIG. 8 is a perspective view of the inlet device according to one embodiment of the present invention.

Referring to FIG. 8, inlet device 703 is shown, according to one embodiment of the present invention. Inlet device 703 consists of a mesh screen 804, a deck 805, a weir 803, and a base 801. Base 801 may be comprised of a buoyant, impermeable material. Base 801 may have a hole 807 formed through it to allow stormwater to fill filtration chamber 701. In another embodiment, base 801 may be made of a porous material instead of having a hole. In one embodiment, weir 803 may be attached to and extend upward from base 801. Weir 803 may be comprised of a water-impermeable material. Mesh screen 804 may be attached to base 801 and may extend upwardly above and outside of weir 803. Mesh screen 804 forms a porous wall. In one embodiment, mesh screen 804 may be a wire or nylon mesh screen, with a mesh size that is larger than the expected sediment particle size. Impermeable deck 805 may be attached to mesh screen 804 above the top of weir 803. Deck 805 forms an impermeable deck and has a small inlet hole 806, in which stormwater flows through. The stormwater may be introduced from inlet line 702, through inlet device 703, and into filtration chamber 701. In one embodiment, deck 805 may be sloped so that the influent stormwater is directed toward hole 806.

Inlet device 703 may be adapted so that it moves with the level of the stormwater in filtration system 700. During operation, inlet device 703 may be positioned such that the top of base 801 may be level with the bottom of inlet line 702. In this arrangement, the influent stormwater may be directed into the filtration chamber 701 through hole 807. Weir 803 may prevent unfiltered stormwater from bypassing inlet device 703. Weir 803 may also prevent unfiltered stormwater from backing up into inlet device 703. During high flow events—which generally correspond to infrequent operating conditions, such as those during flooding or a thunderstorm or other high-intensity runoff events—water may pass over inlet device 703, through mesh screen 804, and flow downstream, to prevent the filtration system from backing up.

Figure 9A:
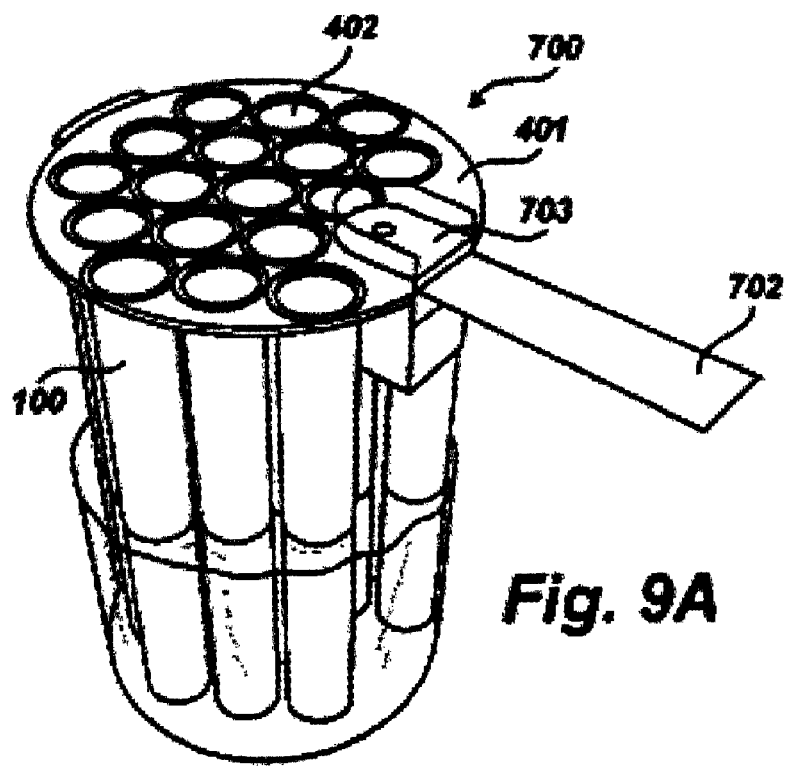
FIGS. 9A-9B are perspective views of the filtration system according to one embodiment of the present invention.
Figure 9B:
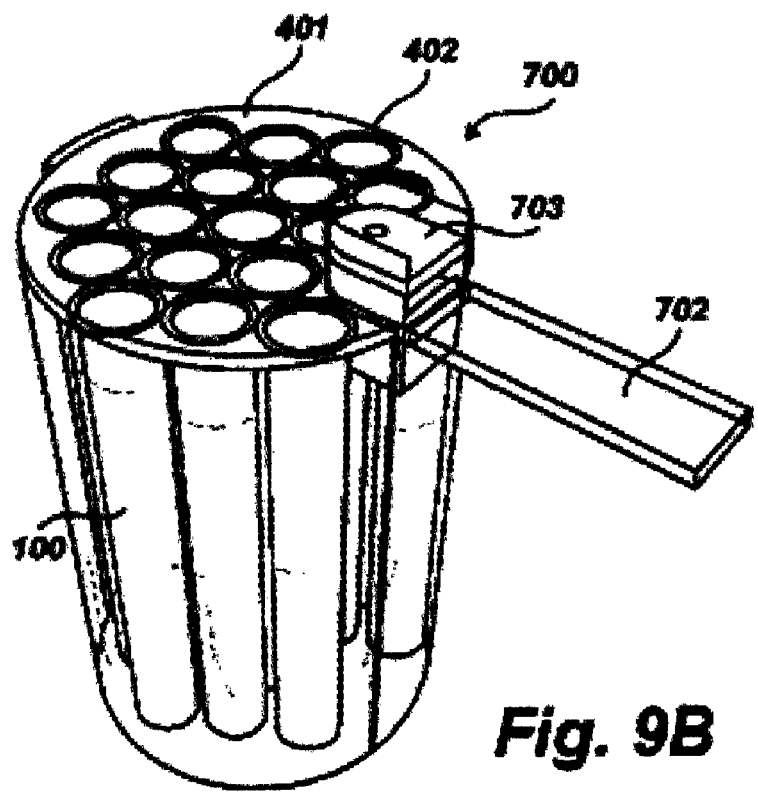

Referring to FIGS. 8 and 9A, inlet device 703 may also be positioned such that deck 805 may be level with the bottom of inlet line 702. In this arrangement, the influent stormwater flows simultaneously through hole 806 into filtration chamber 701, and also through mesh screen 804, through elements 100 and into filtration chamber 701, thus backwashing elements 100. Referring to FIG. 8 and 9B, as the level of water in the filtration chamber rises, the inlet device 703 may rise until the top of base 801 may be level with the bottom of influent line 702. The influent stormwater may be directed into the filtration chamber 701 through hole 807, and normal filtration operation proceeds.

In normal operation, stormwater is introduced into filtration system 700 via inlet line 702. The stormwater flows through inlet device 703 and fills filtration chamber 701. As filtration chamber 701 fills with water, the aqueous portion of the stormwater permeates through each elongated filtration element 100. Fiberglass batting 201, which is exposed to the stormwater, traps a substantial amount of the sediment in the stormwater. As the aqueous portion flows through each elongated filtratable element 100, fiberglass batting 201 is pressed against backing mesh 202, forming a permeable filter bed. A deck 1000 separates filtration system 700 into two parts: a lower housing and an upper housing. In one embodiment, deck 1000 may be impermeable. After the lower housing of filtration system 700 fills completely with stormwater, influent stormwater accumulates on inlet device 703 creating the driving forces for stormwater to permeate through each elongated filtratable element 100. The aqueous portion, after permeating through filter mat 102, travels upward through elongated filtration element 100 and out holes 402 in filtration cartridge 400. Deck 1000 separates the influent stormwater from the filtrate. The filtrate then flows downstream away from the filtration system 700.

Figure 10A:
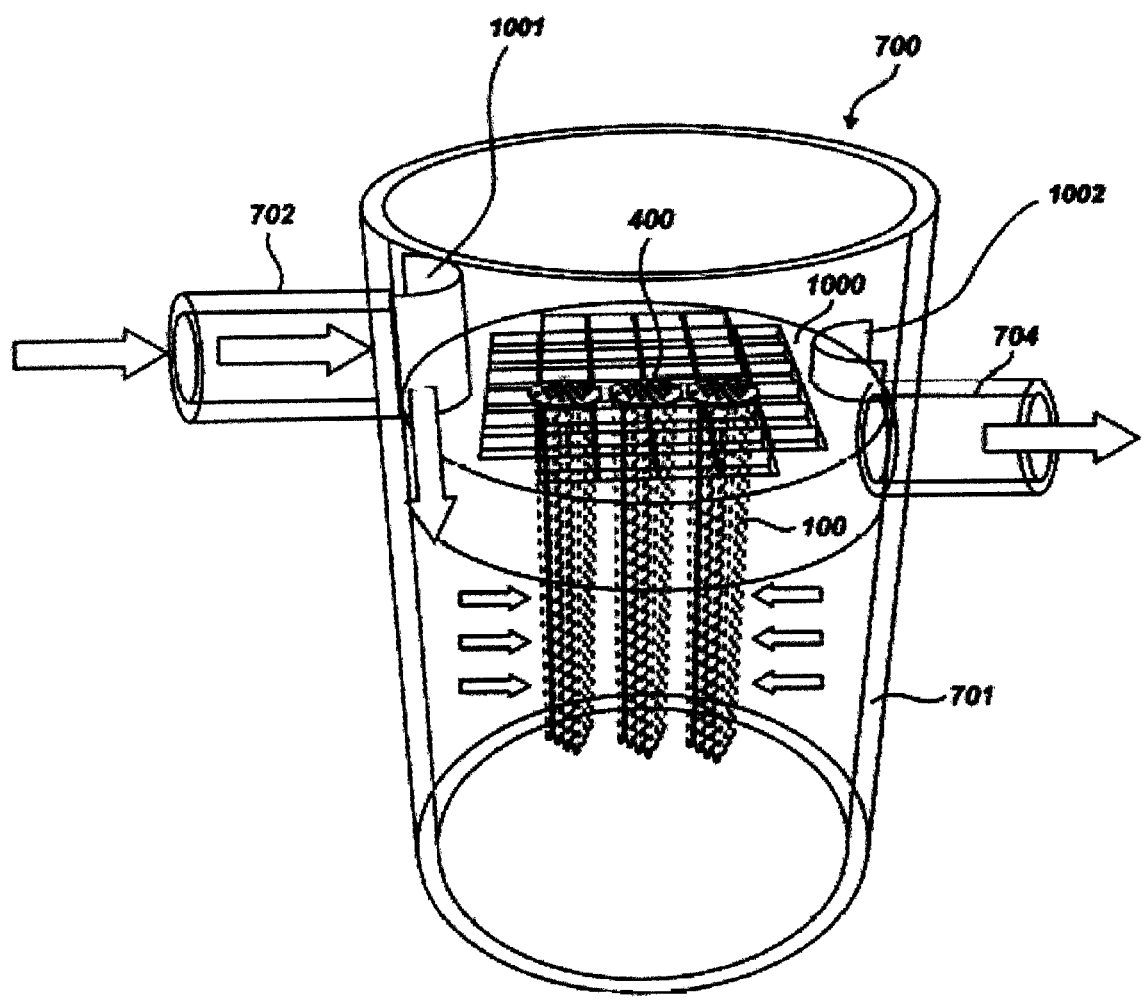
FIGS. 10A-10B are perspective views of a filtration system according to one embodiment of the present invention.

Referring to FIG. 10A, a filtration system with a backwashing mechanism is shown, according to one embodiment of the present invention. In this embodiment, filtration system 700 has an inlet impermeable weir 1001 and an outlet impermeable weir 1002. In operation, the stormwater flows through an inlet opening created by impermeable weir 1001 and fills filtration chamber 701. Impermeable weir 1001 separates the influent stormwater from the filtrate. As filtration chamber 701 fills with water, the aqueous portion of the stormwater permeates through each elongated filtration element 100. The filtrate then accumulates above deck 1000 until it overflows outlet impermeable weir 1002 and exits system 700. Outlet impermeable weir 1002 allows for a level of filtrate to accumulate above deck 1000. When flow stops, the stormwater that remains in lower chamber of filtration system 700 drains down through infiltration, connection to a dry well, or any other drain-down mechanism. As the water level in the lower chamber drops, the filtrate that is accumulated above deck 1000 flows downward through each filtration cartridge 400, backwashing each elongated filtratable element 100 and removing any trapped sediment.

Figure 10B:
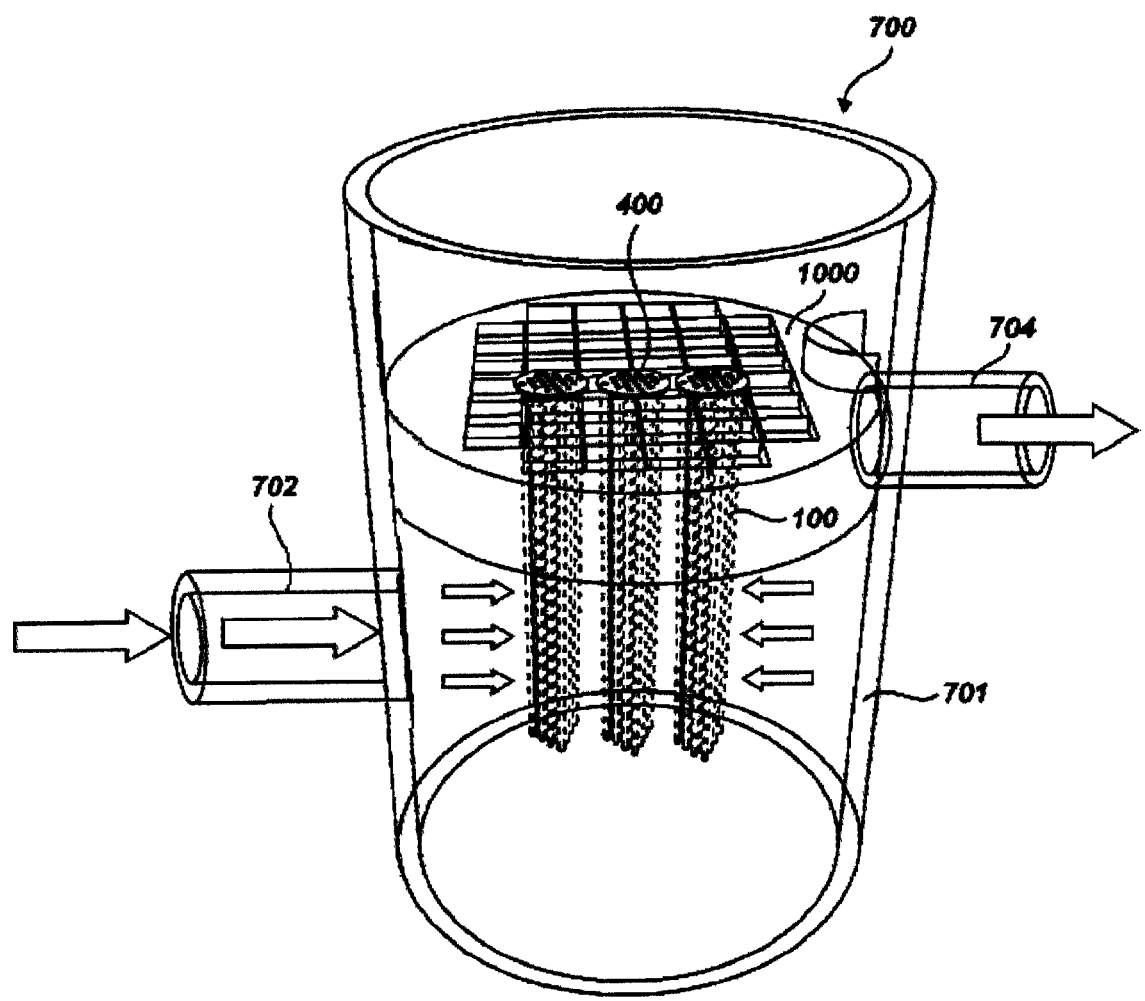

Referring to FIG. 10B, in another embodiment, inlet line 702 may feed directly into filtration chamber 701 beneath deck 1000. In this embodiment, inlet line 702 would be positioned, in relation to filtration chamber 701, so that a sufficient hydraulic head is created to cause stormwater to flow through elongated filtratable elements 100 and out outlet line 704. In general, this will require inlet line 702 to be positioned at a height above filtration chamber 701 and outlet line 704. For example, inlet line 702, at some point upstream of filtration chamber 701, may be elevated above filtration chamber 701 and then slope downward and connect to filtration chamber 701 below deck 1000.

Figure 11:
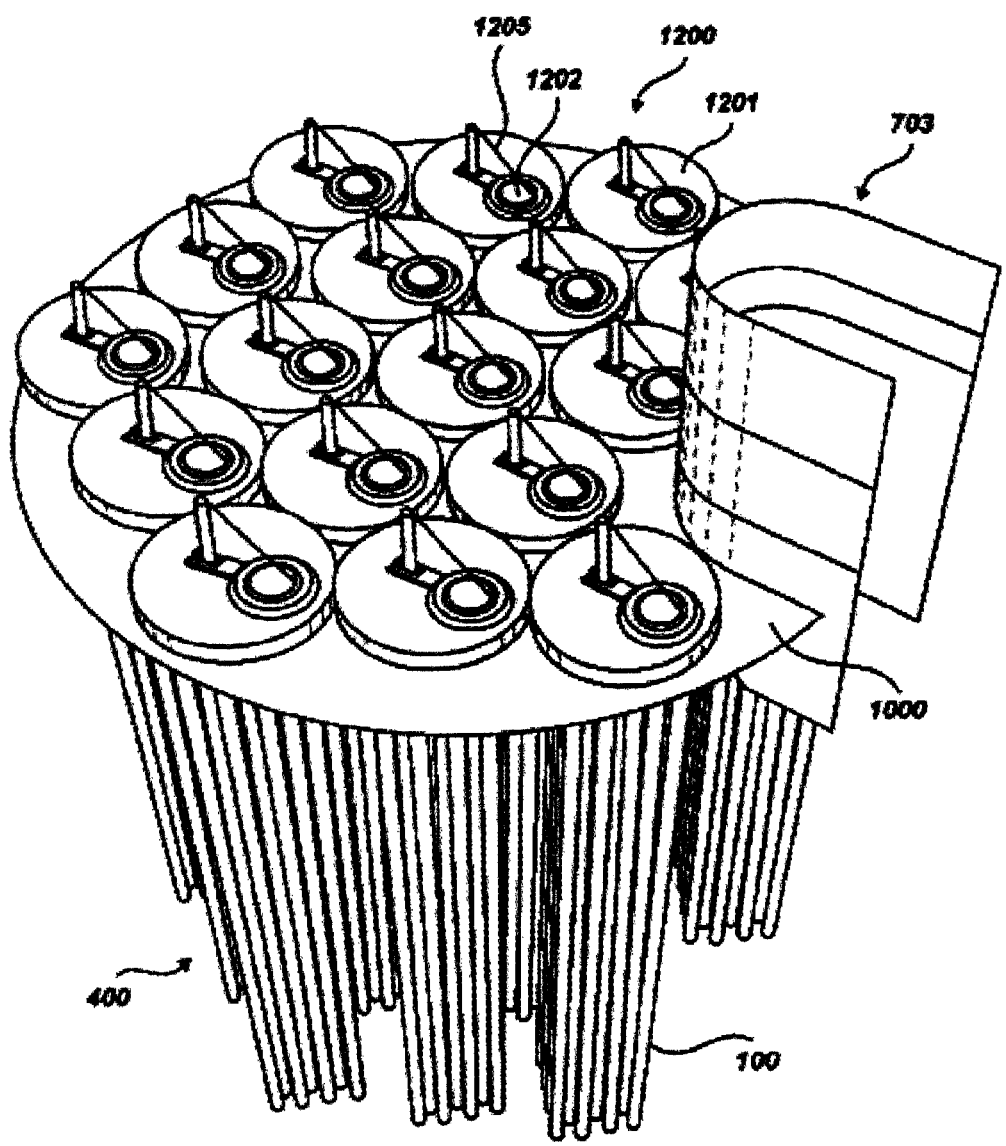
FIG. 11 is a perspective view of a filtration system with a backwashing mechanism according to one embodiment of the present invention.
Figure 12A:
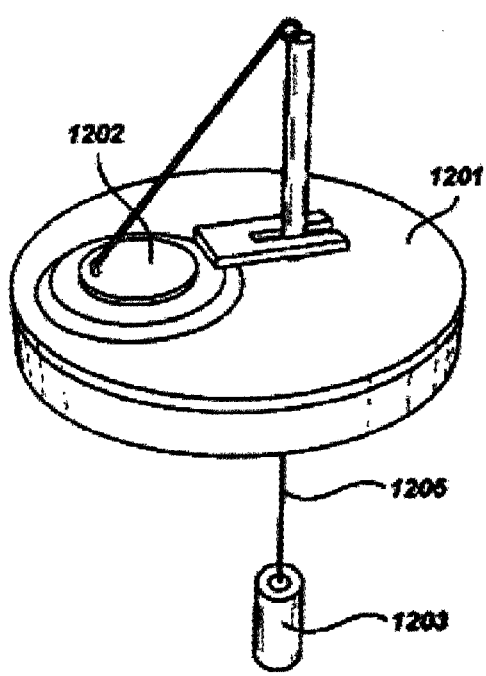
FIGS. 12A-12B are perspective views of a valve assembly according to one embodiment of the present invention.

Referring to FIG. 11, a filtration system with a backwashing mechanism is shown, according to another embodiment of the present invention. In this embodiment, filtration system 700 has a plurality of filtration cartridges 400 with each cartridge 400 being equipped with its own backwashing valve assembly 1200. Referring to FIG. 12A, valve assembly 1200 may generally include five components: a cartridge cover 1201, a release valve 1202, a float 1203, a hole 1204, and a tether 1205. In general, valve assembly 1200 enables each elongated filtratable element 100 to be backwashed between rain events in order to remove trapped sediment.

Figure 12B:
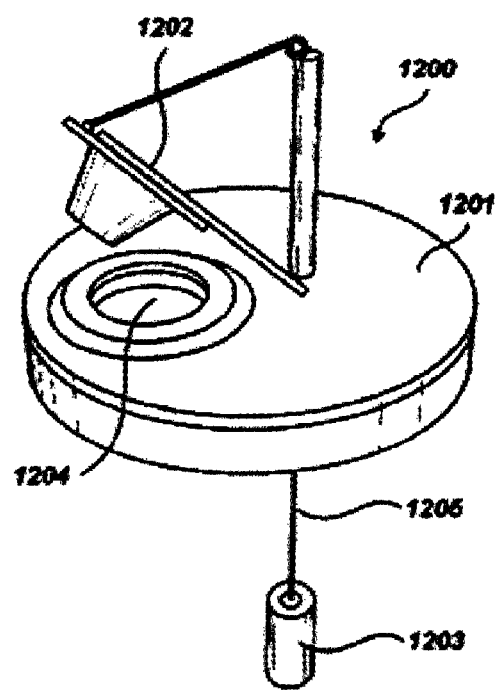

Cartridge cover 1201 may be adapted so that it sealably and removably covers each filtration cartridge 400 in filtration system 700. Tether 1205 attaches release valve 1202, which may be pivotally attached to cartridge cover 1201, to float 1203. Release valve 1202 may have a plug that fits into hole 1204. Valve assembly 1200 has two primary operating positions: a generally closed position, as shown in FIG. 12A, and an open position, as shown in FIG. 12B.

Figure 13:
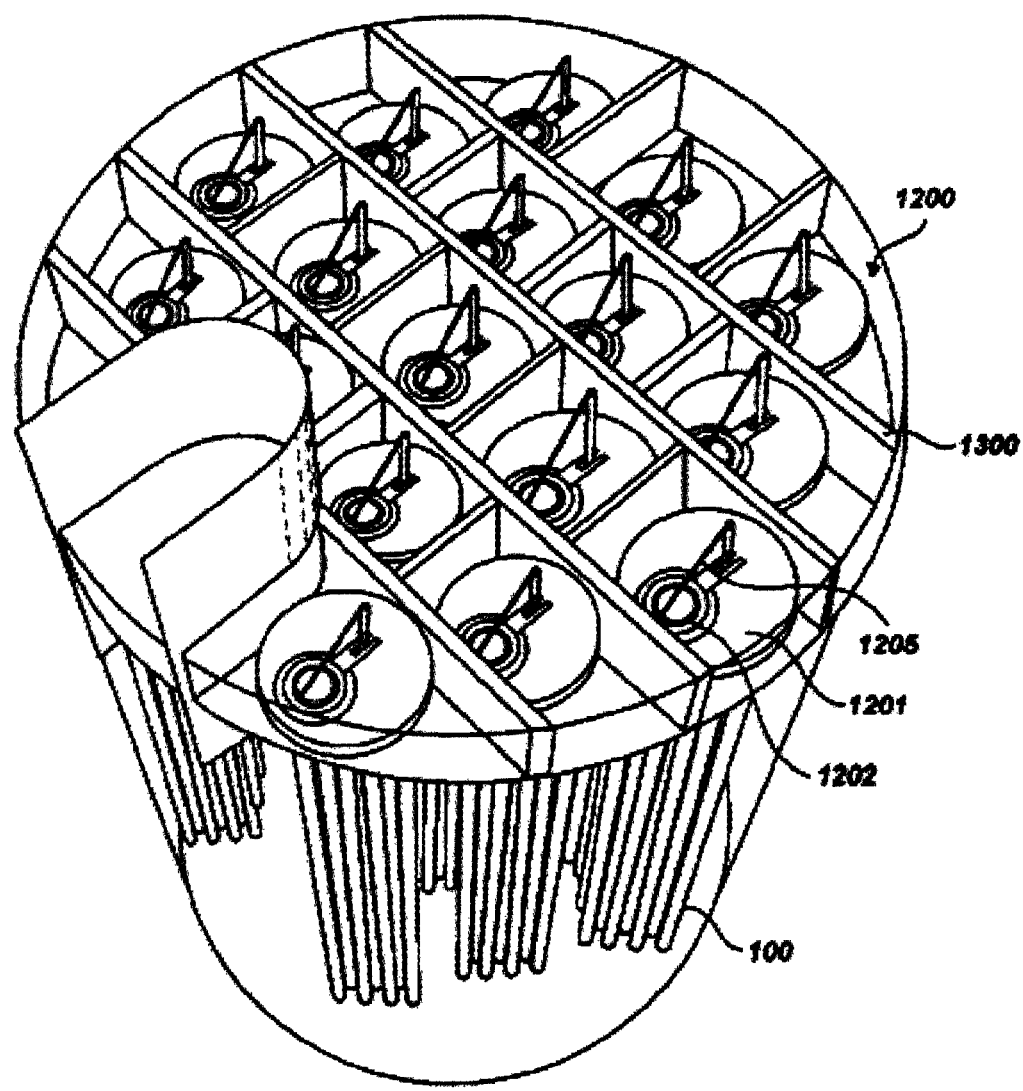
FIG. 13 is a perspective view of a filtration system with a backwashing mechanism with a partition, where accumulated filtrate is above each valve assembly according to one embodiment of the present invention.
Figure 14:
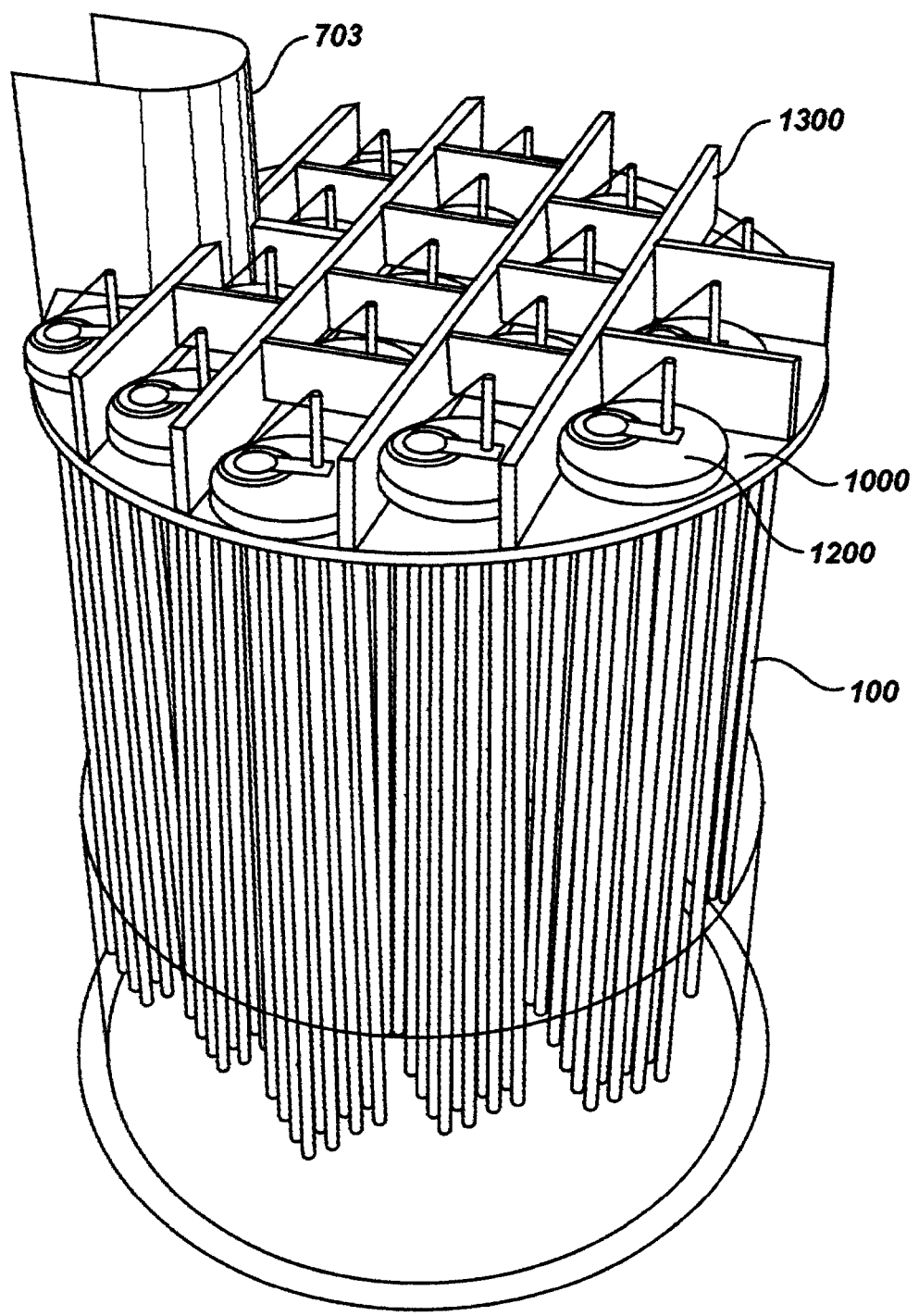
FIG. 14 is a perspective view of a filtration system with a backwashing mechanism where each elongated filtratable element has been backwashed according to one embodiment of the present invention.

Referring to FIGS. 13 and 14, filtration system 700 is in an operating position where stormwater has completely filled the lower housing and a small amount of filtrate has accumulated above each valve assembly 1200. In normal operation, not the backwashing operation, release valve 1200 may be slightly forced open by the filtrate flowing upward through filtration cartridge 400 so that filtrate accumulates on deck 1000 before it flows out of filtration system 700 via outlet 704. In one embodiment, as shown in FIG. 13, each valve assembly 1200 may be separated using a partition 1300 so that each filter cartridge 400 may have its own "tank" of filtrate for later use during backwashing. In this embodiment, outlet line 704 (not shown) may be at the level of the top of partition 1300.

During normal operation, filtrate flows up through each elongated filtratable element 100 as usual. When the flow of influent stormwater stops, release valve 1202 closes to prevent any of the filtrate that has accumulated on the upper housing of filtration system 700 from draining down through each filtration cartridge 400. When flow stops, the stormwater that remains in lower chamber of filtration system 700 drains down through infiltration, connection to a dry well, or any other drain-down mechanism. Float 1203 travels downward as the stormwater in the lower housing is drained. When the water level in the lower chamber drops to the desired level, release valve 1202 may be pulled open by float 1203 via tether 1205. In one embodiment, tether 1205 may be long enough to allow float 1203 to reach a level below each elongated filtratable element 100. When release valve 1202 opens, the "tank" of accumulated filtrate above each filtration cartridge 400 flushes downward, backwashing each filtratable element 100 and removing any trapped sediment.

Figure 15:
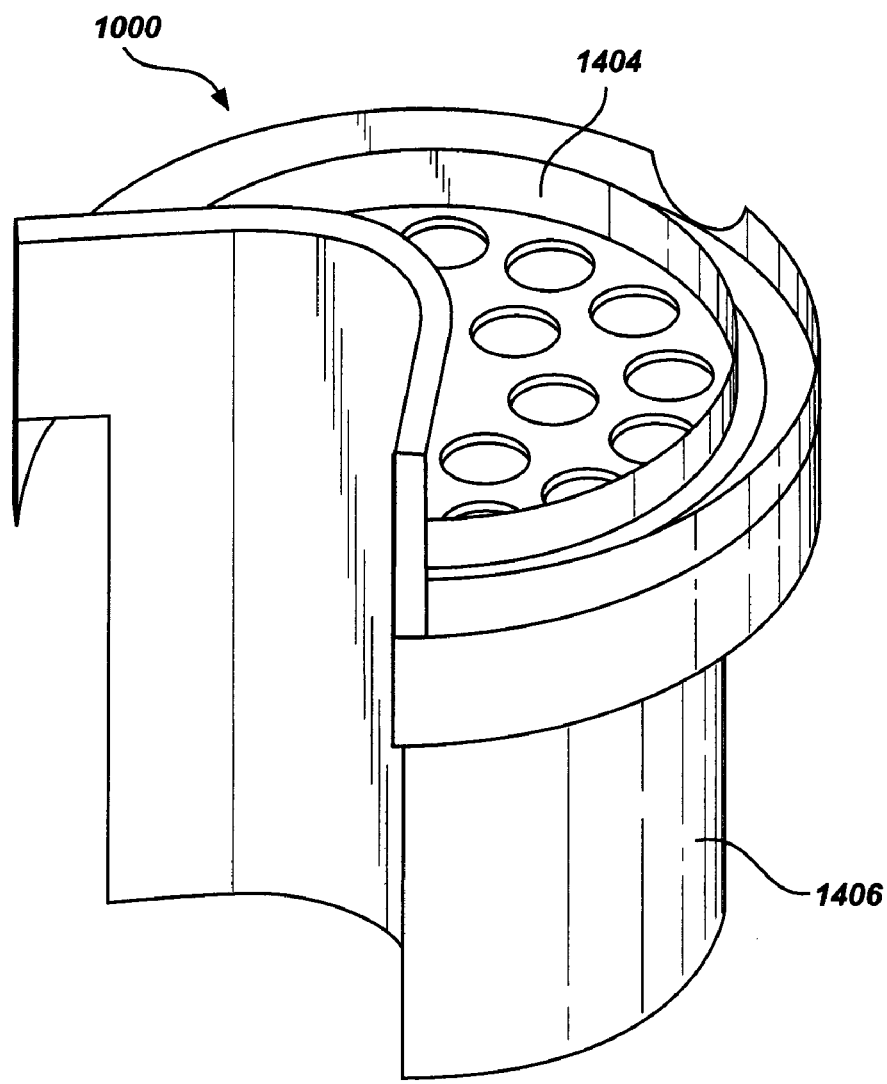
FIG. 15 is a perspective view of a deck for a filtration system according to one embodiment of the present invention.

Referring to FIG. 15, deck 1000 for filtration system 700 is shown according to one embodiment. In this embodiment, deck 1000 may be generally described as an insert that securely fits into filtration chamber 701. Deck 1000 may divide filtration chamber 701 into an upper chamber above deck 1000, and a lower chamber below deck 1000. Deck 1000 may have one or more holes for mounting one or more filtration cartridges (not shown). Further, deck 1000 may have a ridge 1404 attached to or integrally formed with the top surface of impermeable deck 1000. Ridge 1404 may form perimeter on deck 1000. Ridge 1404 may generally surround holes 1402. Ridge 1404 acts as an outlet weir for the filtered water that filters through each filtration cartridge 400. Ridge 1404 may be of any suitable height and thickness. Water may exit filtration system 700 by flowing over ridge 1404 and onto another portion of deck 1000, proceeding downstream via outlet line 704.

Deck 1000 may also have a skirt 1406. Skirt 1406 may be attached to or integrally formed with the bottom surface of deck 1000. Skirt 1406 may extend below deck 1000 at some distance. Skirt 1406 may substantially surround or entirely surround elongated filtratable elements 100 that reside in the lower chamber of filtration system 700. Skirt 1406 may be of any suitable length; it may extend beyond, be of the same length, or be shorter than elongated filtratable elements 100.

Figure 16:
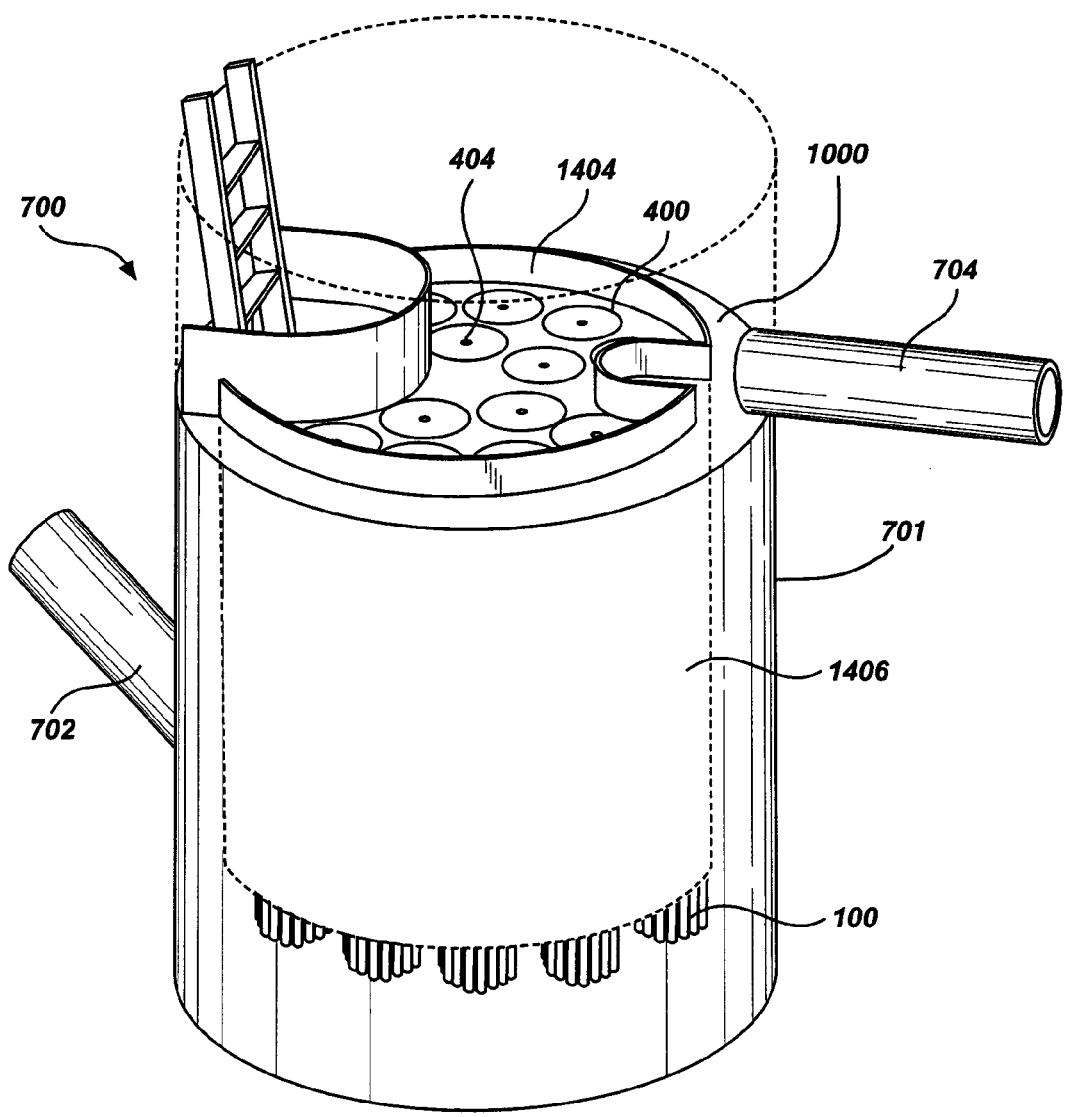
FIG. 16 is a side perspective view of a filtration system according to one embodiment of the present invention.

Referring to FIG. 16, another embodiment of filtration system 700 is shown according to one embodiment. In this embodiment, deck 1000, having ridge 1404 and skirt 1406, may be installed into filtration chamber 701. Deck 1000 may have a substantially circular outer perimeter and may be sized to fit within the walls of filtration chamber 701. Deck 1000 may also be shaped to provide access for maintenance. The access way may be of any shape and depth. The access way may allow for inspecting and maintaining filtration system 700. For example, a ladder, or ladder rungs, may be located within the access way.

In this embodiment, inlet line 702 may be located below deck 1000. Inlet line 702 may be located above the bottom of skirt 1406. Inlet line 702 may be tangential to filtration chamber 701. Therefore, influent may be introduced tangentially into filtration chamber 701 below deck 1000. Influent may be directed in a circular path around skirt 1406, which may allow coarse sediments to settle at the bottom of filtration chamber 701, and floatable pollutants to rise and be trapped underneath deck 1000 and outside of skirt 1406. In other words, influent is introduced into filtration system 700 via tangential inlet line 702. This arrangement causes the influent to "swirl" around skirt 1406, eventually flowing under skirt 1406, then upward and through elongated filtration elements 100. In this embodiment, each filtration cartridge 400 is shown as being covered by lid 404. The aqueous portion flows through each elongated filtratable element 100, through hole 406 in lid 404, and onto deck 1000. Filtered water accumulates above deck 1000 until it reaches a level to overflow ridge 1404. Water then exits filtration system 700 through outlet line 704.

Figure 17:
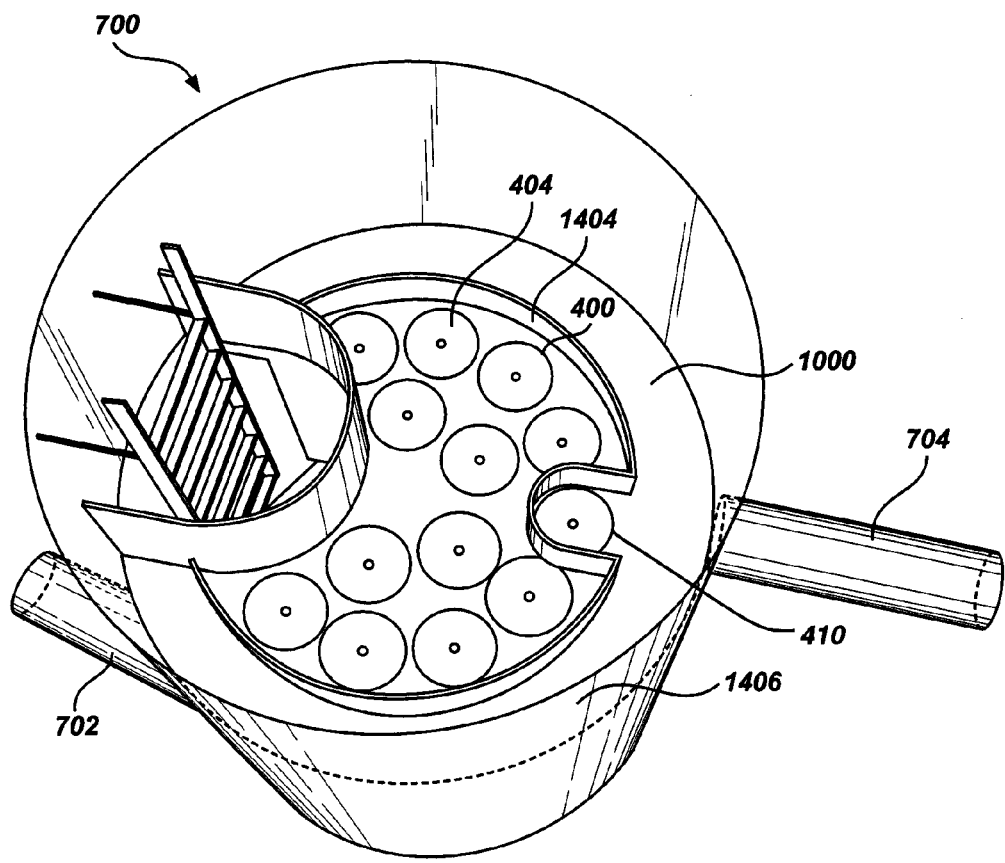
FIG. 17 is a top perspective view of a filtration system according to one embodiment of the present invention.

Referring to FIG. 17, one or more filtration cartridges 400 may be installed outside ridge 1404. For example, filtration cartridge 410 may be located outside of ridge 1404. This embodiment allows for backwashing of elongated filtratable elements 100. When flow subsides from inlet 702, water that has accumulated above deck 1000 and inside of ridge 1404 then flows backwards through filtration cartridges 400 located inside of ridge 1404. The water flows downward, through each elongated filtratable elements 100 and into the lower portion of filtration chamber 701. Because there is one or more filtration cartridges 400 located outside of ridge 1404, water then flows upward through one or more filtrations cartridges 400 installed outside of ridge 1404. Therefore, this embodiment allows for filtration cartridges 400 that are located inside of ridge 1404 to be backwashed with filtered water.

Figure 18:
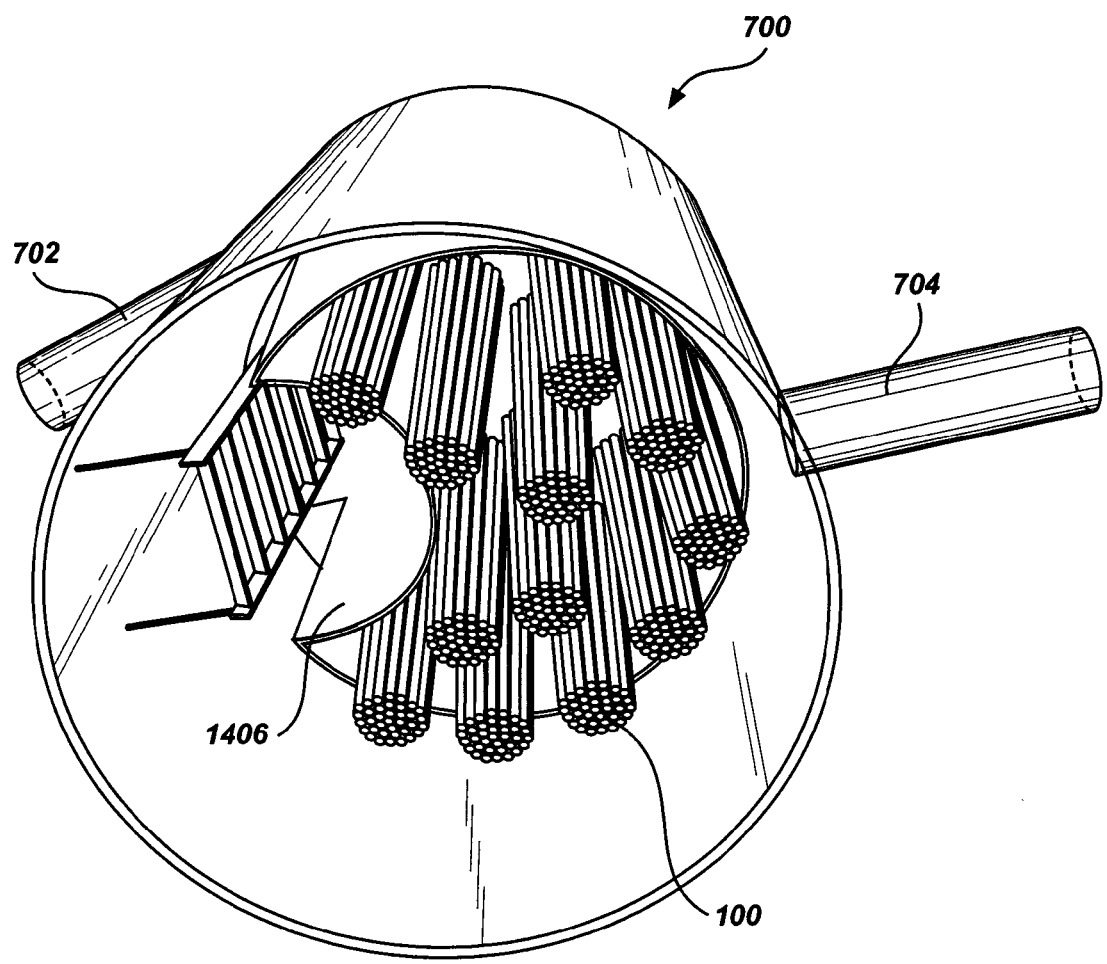
FIG. 18 is a bottom perspective view of a filtration system according to one embodiment of the present invention.

Referring to FIG. 18, a bottom view of one embodiment of filtration system 700 is shown. This embodiment shows that skirt 1406 surrounds elements 100 from each filtration cartridge 400, even the one or more filtration cartridges 400 that may be installed outside of ridge 1404. In another embodiment, skirt 1406 may not surround the fitratable elements 100 from each filtration cartridge. A portion of skirt 1406 may also define the access way.

EXAMPLE

An experiment was conducted using five filtration cartridges, each having eighteen elongated filtratable elements, for a total of 90 elements. Each elongated filtratable element was constructed by wrapping filter mats around a flexible inner core, and enclosing the filter mats in a nylon screen. Each filtratable element was 0.75" in diameter and 48" long. The elongated filtratable elements tested had a surface area of about 90 square feet. The filtration cartridges were placed inside a 3' diameter filtration chamber. With less then 5 inches of headloss, the prototype filtration system was able to remove over 5 kg of sil-co-sil 106 (a standard fine sediment mixture) from the influent water having a flow rate of 1 L/s and a sediment concentration of 300 mg/L. The filter cartridge occupied approximately 1 square foot of area in an impermeable deck separating the unfiltered and filtered water. The effluent water stream had a sediment content less than 20% of the influent concentration. It is reasonable to assume, based on these results, that this type of device could remove fine sediment for the runoff generated by an acre of impervious area, be contained in a chamber less than 10 feet in diameter, and last for over 1 year before the filter had clogged or needed to be replaced. The total suspended solid removal, or sediment removal, efficiency was 90-92%.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A water runoff system for removing suspended particles from a liquid, the system comprising:
    a filter chamber defining an internal chamber;
    a deck positioned within said internal chamber and dividing said filter chamber into an upper chamber and a lower chamber, the deck having a plurality of holes formed therein, each hole having a filtration element therein;
    an inlet line for introducing a liquid into said lower chamber;
    an outlet above said deck for permitting liquid to exit said upper chamber; and
    a ridge positioned on a top surface of the deck, wherein said ridge forms a continuous perimeter on the top surface of the deck and has at least one filtration element positioned within said perimeter;

wherein, when flow subsides from said inlet, liquid that has accumulated above said deck and inside of said perimeter, then flows backwards through any filtration elements located inside of said perimeter, flowing downward, and into said lower chamber and up through an opening in said deck which is external of said perimeter, thereby backwashing filter elements located inside the perimeter with filtered liquid.

2. The system of claim 1, wherein at least one of the filtration elements is positioned outside the perimeter.

3. The system of claim 1, wherein said filtration elements comprise at least one elongated filter element and a lid.

4. The system of claim 1, wherein the system further comprises a tangential inlet line for introducing liquid below the deck.

5. The system of claim 1, wherein the deck comprises an access way from the upper chamber to the lower chamber.

6. The system of claim 1, further including a skirt that surrounds at least one of the filtration elements.

7. The system of claim 1, further including a skirt that surrounds all of the filtration elements.

8. The system of claim 1, wherein said filtration element comprises a filtration cartridge.

* * * * *